US007702027B2

(12) United States Patent
Shirakata et al.

(10) Patent No.: US 7,702,027 B2
(45) Date of Patent: Apr. 20, 2010

(54) DATA TRANSMISSION METHOD AND DATA RECEPTION METHOD

(75) Inventors: Naganori Shirakata, Osaka (JP); Yasuo Harada, Maidenhead (GB); Koichiro Tanaka, Hyogo (JP); Tomohiro Kimura, Osaka (JP); Shuya Hosokawa, Osaka (JP); Yoshio Urabe, Nara (JP)

(73) Assignee: Panasonic Corporation, Osaksa (JP)

( * ) Notice: Subject to any disclaimer, the term of this patent is extended or adjusted under 35 U.S.C. 154(b) by 997 days.

(21) Appl. No.: 10/573,044

(22) PCT Filed: Mar. 9, 2005

(86) PCT No.: PCT/JP2005/004110
§ 371 (c)(1),
(2), (4) Date: Mar. 22, 2006

(87) PCT Pub. No.: WO2005/088884
PCT Pub. Date: Sep. 22, 2005

(65) Prior Publication Data
US 2007/0121750 A1 May 31, 2007

(30) Foreign Application Priority Data
Mar. 11, 2004 (JP) ............................. 2004-069440
Aug. 2, 2004 (JP) ............................. 2004-225840

(51) Int. Cl.
*H04B 7/02* (2006.01)

(52) U.S. Cl. ..................... 375/267; 375/299; 375/347

(58) Field of Classification Search ................. 375/267, 375/299, 347; 455/101, 132
See application file for complete search history.

(56) References Cited

U.S. PATENT DOCUMENTS 6,317,098 B1 * 11/2001 Andrews et al. ............ 343/797

(Continued)

FOREIGN PATENT DOCUMENTS

CN 1380778 11/2002

(Continued)

*Primary Examiner*—David C Payne
*Assistant Examiner*—Leon-Viet Q Nguyen
(74) *Attorney, Agent, or Firm*—Wenderoth, Lind & Ponack, L.L.P.

(57) ABSTRACT

In a transfer apparatus to which MIMO-OFDM is applied, a data transmission method and a data reception method are provided in which, even when there are frequency errors varying among transfer paths, the precision of estimation of an inverse propagation coefficient function can be improved, thereby making it possible to suppress a degradation in characteristics. Among symbols composed of a plurality of subcarriers orthognal to each other, the transfer apparatus uses, as a synchronization symbol, a symbol in which predetermined amplitudes and phases are assigned to a plurality of subcarriers spaced at predetermined frequency intervals. The synchronization symbol is divided into transmission antennas to generate a plurality of synchronization subsymbols, which are in turn simultaneously transmitted from a plurality of transmission antennas. A reception apparatus estimates a frequency error for each transfer path based on synchronization subsymbols included in signals received by a plurality of reception antennas, and based on the estimated frequency errors, corrects the received signals.

17 Claims, 18 Drawing Sheets

U.S. PATENT DOCUMENTS

| | | |
|---|---|---|
| 7,242,720 B2 | 7/2007 | Sugiyama et al. |
| 7,436,757 B1 * | 10/2008 | Wilson et al. ............... 370/203 |
| 2002/0018483 A1 | 2/2002 | Kuwabara et al. |
| 2002/0191535 A1 * | 12/2002 | Sugiyama et al. ........... 370/208 |
| 2003/0072255 A1 * | 4/2003 | Ma et al. .................... 370/208 |
| 2004/0233838 A1 | 11/2004 | Sudo et al. |
| 2005/0147186 A1 * | 7/2005 | Funamoto et al. ........... 375/324 |
| 2007/0263667 A1 * | 11/2007 | Dubuc et al. ................ 370/500 |

FOREIGN PATENT DOCUMENTS

| | | |
|---|---|---|
| EP | 1 126 647 | 8/2001 |
| JP | 11-205205 | 7/1999 |
| JP | 2000-209145 | 7/2000 |
| JP | 2001-345777 | 12/2001 |
| JP | 2003-060604 | 2/2003 |
| JP | 2003-204314 | 7/2003 |
| JP | 2003-283359 | 10/2003 |
| JP | 2003-304216 | 10/2003 |
| WO | 01/17148 | 3/2001 |

* cited by examiner (a)

DATA SYMBOL SEQUENCE 1

(b)

DATA SYMBOL SEQUENCE 2

☐ DATA CARRIER   ■ PILOT CARRIER   ⊠ NULL CARRIER

DATA TRANSMISSION METHOD AND DATA RECEPTION METHOD

TECHNICAL FIELD

The present invention relates to a data transmission method of transmitting a plurality of data sequences from a plurality of transmission antennas using MIMO-OFDM, and a data reception method of receiving a plurality of data sequences with a plurality of reception antennas. More particularly, the present invention relates to a data transmission method and a data reception method capable of improving the precision of estimation of an inverse propagation coefficient function and suppressing a degradation in characteristics even in the presence of frequency errors varying among transfer paths.

BACKGROUND ART

In recent years, as a transfer method for use in broad-band mobile communications, MIMO-OFDM (Multi Input Multi Output Orthogonal Frequency Division Multiplexing) has attracted attention. Hereinafter, MIMO-OFDM will be described.

For mobile communications, such as wireless LAN and the like, OFDM, which is a type of multi-carrier transfer, has been used as a modulation technique which is resistant to frequency selective fading occurring in the multi-path environment. With the aim of improving the efficiency of use of frequency, a technique of performing multiplex communication between a transmitter and a receiver via a plurality of paths obtained by space division, where a plurality of transmission antennas and a plurality of reception antennas are used to construct MIMO channels (the technique is hereinafter referred to as MIMO) has been proposed. In MIMO, the number of channels can be increased by the number of transmission antennas.

A combination of OFDM, which is robust with respect to multi-path, and MIMO, which improves the efficiency of use of frequency, is MIMO-OFDM. A conventional transfer apparatus to which MIMO-OFDM is applied (hereinafter referred to as a conventional transfer apparatus) is disclosed in, for example, Japanese Patent Laid-Open Publication No. 2003-60604. FIG. 18 is a block diagram illustrating an exemplary structure of the conventional transfer apparatus. In FIG. 18, the conventional transfer apparatus is a transfer apparatus in which the number of transmission antennas is two and the number of reception antennas is two (i.e., a 2×2 MIMO-OFDM transfer apparatus).

In FIG. 18, the conventional transfer apparatus is composed of a transmission apparatus and a reception apparatus. The transmission apparatus comprises a preamble generating section 901, data modulating sections 902 and 903, multiplexers 904 and 905, orthogonal modulation sections 906 and 907, a local oscillator 908, and transmission antennas TX1 and TX2. The reception apparatus comprises reception antennas RX1 and RX2, a local oscillator 909, orthogonal demodulation sections 910 and 911, frequency error estimating sections 912 and 913, an averaging section 914, frequency correcting sections 915 and 916, an inverse propagation function estimating section 917, and data demodulating sections 918 and 919.

In the transmission apparatus, the preamble generating section 901 generates a synchronization preamble Ssync and a propagation coefficient estimation preamble Sref. The data modulating section 902 subjects data to be transmitted from the transmission antenna TX1 (hereinafter referred to as a data sequence 1) to OFDM modulation to output a data symbol sequence 1. The data modulating section 903 subjects to data to be transmitted from the transmission antenna TX2 (hereinafter referred to as a data sequence 2) to OFDM modulation to output a data symbol sequence 2.

The multiplexer 904 subjects the data symbol sequence 1, the synchronization preamble Ssync, and the propagation coefficient estimation preamble Sref to time division multiplexing to generate a transfer frame 1. The multiplexer 905 subjects the data symbol sequence 2, the synchronization preamble Ssync, and the propagation coefficient estimation preamble Sref to time division multiplexing to generate a transfer frame 2. FIG. 19 is a diagram illustrating an exemplary transfer frame used in the conventional transfer apparatus. In FIG. 19, in the transfer frame, the synchronization preamble Ssync and the propagation coefficient estimation preamble Sref are inserted before the data symbol sequence.

The transfer frame 1 is converted into a radio signal by the orthogonal modulation section 906 and the local oscillator 908. The transfer frame 2 is converted into a radio signal by the orthogonal modulation section 907 and the local oscillator 908. The transfer frame 1 and the transfer frame 2 which have been converted into radio signals are simultaneously transmitted from the transmission antenna TX1 and the transmission antenna TX2.

Radio signals transmitted by a plurality of transmission antennas TXi are received via different paths by a plurality of reception antennas RXj. Note that i represents a transmission antenna number, and j represents a reception antenna number. Here, when a transfer path between the transmission antenna TXi and the reception antenna RXj is represented by p (i, j), in the case of 2×2 MIMO the conventional transfer apparatus has four transfer paths p (1, 1), p (1, 2), p (2, 1), and p (2, 2). When a propagation coefficient possessed by the transfer path p (i, j) is represented by h (i, j) and a transmitted signal transmitted by the transmission antenna TXi is represented by Ti, a received signal Rj received by the reception antenna RXj can be represented by expressions (1) and (2).

$$R1 = h(1,1)T1 + h(2,1)T2 \qquad (1)$$

$$R2 = h(1,2)T1 + h(2,2)T2 \qquad (2)$$

In the reception apparatus, the received signal R1 is converted into a frequency band which is optimal to a subsequent-stage process, by the local oscillator 909 and the orthogonal demodulation section 910. The frequency error estimating section 912 estimates a frequency error (hereinafter referred to as a frequency error 1) contained in the received signal R1 based on the synchronization preamble Ssync. Similarly, the received signal R2 is converted into a frequency band which is optimal to a subsequent-stage process, by the local oscillator 909 and the orthogonal demodulation section 911. The frequency error estimating section 913 estimates a frequency error (hereinafter referred to as a frequency error 2) contained in the received signal R2 based on the synchronization preamble Ssync. The frequency error 1 and the frequency error 2 are averaged by the averaging section 914.

The frequency correcting section 915 corrects a frequency of the received signal R1 based on the frequency error averaged by the averaging section 914. The frequency correcting section 916 corrects a frequency of the received signal R2 based on the frequency error averaged by the averaging section 914. The received signals R1 and R2 whose frequencies have been corrected are input to the inverse propagation function estimating section 917. The inverse propagation function estimating section 917 estimates an inverse function for the propagation coefficient h (i, j) based on the propagation coefficient estimation preambles Sref contained in the received signal R1 and the received signal R2, and based on the estimated inverse function, separates the multiplexed transmitted signals T1 and T2. The data demodulating section 918 subjects the separated transmitted signal T1 to OFDM demodulation to output the data sequence 1. Similarly, the data demodulating section 919 subjects the separated transmitted signal T2 to OFDM demodulation to output the data sequence 2.

DISCLOSURE OF THE INVENTION

Problems to be Solved by the Invention

However, in the conventional transfer apparatus, a frequency error is estimated based on the same synchronization preambles Ssync transmitted from a plurality of transmission antennas. Therefore, a frequency error can be estimated for each reception antenna, but a frequency error cannot be estimated for each transfer path. A frequency error varies among transfer paths, since there is no correlation between propagation coefficients, there are different Doppler frequency shifts due to multi-path fading, or the like. Therefore, in the conventional transfer apparatus, frequency errors occurring in transfer paths are added together by space multiplexing, so that the precision of estimation and equalization of an inverse propagation coefficient function is reduced, resulting in a degradation in characteristics.

Therefore, an object of the present invention is to provide a data transmission method and a data reception method for a transmission apparatus of transmitting a plurality of data sequences from a plurality of transmission antennas using MIMO-OFDM and a reception apparatus receiving a plurality of data sequences via a plurality of reception antennas, the methods being capable of improving the precision of estimation of an inverse propagation coefficient function even when there is a frequency error varying among transfer paths, thereby suppressing a degradation in characteristics.

Solution to the Problems

The present invention is directed to a data transmission method for a transmission apparatus of transmitting a plurality of data sequences from a plurality of transmission antennas to a plurality of reception antennas using MIMO-OFDM. To achieve the above-described object, the data transmission method of the present invention comprises the steps of dividing a synchronization symbol in which predetermined amplitudes and phases are assigned to a plurality of subcarriers which are spaced at predetermined frequency intervals and are orthogonal to each other, into the plurality of transmission antennas, to generate a plurality of synchronization subsymbols, and converting the plurality of synchronization subsymbols into radio signals, and simultaneously transmitting the radio signals from the plurality of transmission antennas.

Preferably, the data transmission method further comprises modulating a plurality of pieces of transmission data to be transmitted from the plurality of transmission antennas into a plurality of data symbol sequences, and generating propagation coefficient estimation symbols orthogonal between each of the transmission antennas as symbols for estimating inverse functions of propagation coefficients possessed by a plurality of transfer path between the transmission antennas and the reception antennas. The converting and transmitting step includes multiplexing the data symbol sequence, the synchronization subsymbol, and the propagation coefficient estimation symbol into a transfer frame for each of the plurality of transmission antennas, and converting the transfer frame multiplexed for each of the plurality of transmission antennas into a radio signal.

The step of modulating into the data symbol sequence includes generating a data carrier by applying an amplitude and a phase based on the transmission data to a predetermined one of the plurality of subcarriers, generating a pilot carrier by assigning a known phase and amplitude to a subcarrier other than the data carrier, and orthogonally multiplexing the data carrier and the pilot carrier into a plurality of data symbols, and outputting the plurality of orthogonally multiplexed data symbols as the data symbol sequence.

In the step of generating the pilot carrier, a known phase and amplitude are assigned as the pilot carrier to only one of data symbols to be simultaneously transmitted from the plurality of transmission antennas, and an amplitude of 0 is assigned as the pilot carrier to the other data symbols to be simultaneously transmitted.

In the converting and transmitting step, in order to achieve synchronization between the plurality of transmission antennas, a single transmission local oscillator common to the transmission antennas or a plurality of transmission local different among the transmission antennas, are used.

The present invention is also directed to a data reception method for a reception apparatus of receiving a plurality of data sequences transmitted from a plurality of transmission antennas using MIMO-OFDM, via a plurality of reception antennas. The data reception method of the present invention comprises the steps of receiving the plurality of data sequences for each of the reception antennas, synchronizing and demodulating the data sequences received by the plurality of reception antennas for each of the reception antennas, and estimating characteristics possessed by a plurality of transfer paths between the transmission antennas and the reception antennas, for each of the transfer paths, based on the received signal demodulated for each of the reception antennas and the synchronization subsymbol included in the received signal. Note that the plurality of data sequences include synchronization subsymbols generated by dividing a synchronization symbol composed of a plurality of subcarriers orthogonal to each other into the plurality of transmission antennas.

Preferably, the step of estimating the characteristics for each of the transfer paths includes estimating a frequency error occurring in each of the transfer paths from a correlation between the received signal demodulated for each of the reception antennas and the synchronization subsymbol included in the received signal. The data reception method further includes, after the step of estimating the characteristics for each of the transfer paths, correcting a frequency of the received signal based on the estimated frequency error.

The step of correcting the frequency of the received signal includes calculating a frequency correction value for correcting the received signal, for each of the reception antennas, by weighted-averaging the estimated frequency error occurring in each of the transfer paths, and correcting the frequency of the received signal based on the calculated frequency correction value for each of the reception antennas, and outputting the received signal having the corrected frequency.

In the step of estimating the frequency error, a received symbol timing can be generated based on a weighted average of peak timings of correlation values between the received signal and the synchronization subsymbol included in the received signal.

Preferably, the received signal includes propagation coefficient estimation symbols orthogonal to each other between each of the transmission antennas as symbols for estimating inverse functions of propagation coefficients possessed by the plurality of transfer paths between the transmission antennas and the reception antennas. In this case, the data reception method further includes, after the step of correcting the frequency of the received signal, estimating the inverse function of the propagation coefficient for each of the plurality of transfer paths based on the propagation coefficient estimation symbol included in the received signal having the corrected frequency, and based on the estimated inverse function, separating signals transmitted from the plurality of transmission antennas from the plurality of received signals.

The data reception method may further comprise, between the synchronizing and demodulating step and the step of calculating the characteristics for each of the transfer paths, estimating a frequency error included in the demodulated received signal for each of the reception antennas, based on a correlation between the received signal demodulated by the synchronizing and demodulating step for each of the reception antennas, and the synchronization symbol synthesized from the synchronization subsymbol included in the received signal, calculating an average frequency error with respect to the plurality of received signals by weighted-averaging the estimated frequency errors, and a second correcting step of correcting the frequencies of the plurality of received signals based on the calculated average frequency correction value.

The receiving step may include receiving the signals transmitted from the plurality of transmission antennas using reception antennas the number of which is larger than the number of the plurality of data sequences, determining reception levels of the signals received by the larger number of reception antennas, and selecting or combining the signals received by the larger number of reception antennas, depending on the determined reception levels.

In the synchronizing and demodulating step, in order to achieve synchronization between the plurality of reception antennas, a single reception local oscillator common to the reception antennas or a plurality of reception local different among the reception antennas, are used The step of estimating the characteristics for each of the transfer paths may include estimating rough frequency characteristics for each of the transfer paths by interpolation of phases and amplitudes of the plurality of subcarriers included in the received signal, based on the synchronization subsymbol included in the received signal demodulated for each of the reception antennas. The data reception method further comprises, after the step of estimating the characteristics for each of the transfer paths, estimating inverse functions of propagation coefficients possessed by the plurality of transfer paths based on the estimated rough frequency characteristics of each of the transfer paths, and separating signals transmitted by the plurality of transmission antennas from the plurality of received signal based on the estimated inverse functions.

The present invention is also directed to a data transmission apparatus of transmitting a plurality of data sequences from a plurality of transmission antennas to a plurality of reception antennas using MIMO-OFDM. To achieve the above-described object, the transmission apparatus of the present invention comprises a plurality of synchronization subsymbol generating sections, a plurality of modulation sections, and a plurality of transmission antennas. The plurality of synchronization subsymbol generating sections divide a synchronization symbol in which predetermined amplitudes and phases are assigned to a plurality of subcarriers spaced at predetermined frequency intervals, into the plurality of transmission antennas, to generate a plurality of synchronization subsymbols which are orthogonal between each of the plurality of transmission antennas. The plurality of modulation sections modulate the plurality of synchronization subsymbols for the respective transmission antennas. The plurality of transmission antennas simultaneously transmit signals modulated by the plurality of modulation sections.

The present invention is also directed to a reception apparatus of receiving a plurality of data sequences transmitted from a plurality of transmission antennas using MIMO-OFDM, via a plurality of reception antennas. To achieve the above-described object, the reception apparatus of the present invention comprises a plurality of reception antennas, a plurality of demodulation sections, a plurality of synchronization subsymbol correlation sections, and a plurality of frequency correcting sections. The plurality of reception antennas receive the plurality of data sequences. The plurality of demodulation sections synchronize and demodulate the data sequences received by the plurality of reception antennas for each of the reception antennas. The plurality of synchronization subsymbol correlation sections estimate a frequency error included in a received signal demodulated for each of the reception antenna from a correlation between the received signal and the synchronization subsymbol included in the received signal, for each transfer path. The plurality of frequency correcting sections correct a frequency of the received signal based on the estimated frequency error for each of the plurality of reception antennas. Note that the plurality of data sequences include synchronization subsymbols generated by dividing a synchronization symbol composed of a plurality of subcarriers orthogonal to each other for each of the plurality of transmission antennas.

Effect of the Invention

As described above, according to the present invention, in the transmission apparatus, a synchronization symbol in which predetermined amplitudes and phases are assigned to a plurality of subcarriers spaced at predetermined frequency intervals are divided into a plurality of transmission antennas, thereby making it possible to simultaneously transmit a plurality of synchronization subsymbols which are orthogonal to each other, from a plurality of transmission antennas. In the reception apparatus, by calculating a correlation between a synchronization subsymbol included in a received signal and the received signal, it is possible to estimate a carrier frequency error and a propagation delay occurring in each transfer path. Thereby, the transfer apparatus weighted-averages these estimated errors for each reception antenna to correct a received signal, thereby improving the precision of estimation of an inverse propagation coefficient function.

In the reception apparatus, an average frequency error with respect to a plurality of reception antennas can be estimated by calculation of a correlation between a received signal and a synchronization symbol Ssync which are received by each reception antenna. Thereby, the transfer apparatus can cancel a frequency error between transmission and reception local oscillators, thereby making it possible to more correctly perform subsequent-stage synchronization subsymbol correlation calculation.

In the reception apparatus, it is possible to use a synchronization subsymbol to roughly estimate the frequency characteristics of each transfer path in advance. Thereby, the transfer apparatus can improve the precision of estimation of an inverse propagation coefficient function.

In the reception apparatus, even when the reception level of a specific subcarrier decreases in the frequency selective fading environment, the correlation of a synchronization subsymbol can be correctly calculated by the reception diversity effect caused by selection or combination of a plurality of reception antennas. Thereby, the transfer apparatus can more correctly correct a carrier frequency error in each transfer path, thereby improving the precision of estimation of an inverse propagation coefficient function.

In the transmission apparatus, a pilot carrier can be generated in a data symbol by the data modulating section assigning a known phase and amplitude to a predetermined subcarrier. In addition, in the reception apparatus, even when a residual error is present in frequency estimation using a synchronization symbol, a pilot carrier of a data symbol is used to estimate a residual error for each transfer path and correct a propagation coefficient, there by making it possible to improve the precision of estimation of an inverse propagation coefficient function. In addition, in the transfer apparatus, even when the reception level of a specific subcarrier decreases in the frequency selective fading environment, the probability that the reception level of a pilot carrier decreases can be reduced by successively assigning a pilot carrier to all subcarriers. In addition, by the above-described pilot subcarrier assignment method, the precision of interpolation of a propagation path estimation value for each subcarrier can be caused to be uniform.

DESCRIPTION OF THE REFERENCE CHARACTERS

Figure 1:
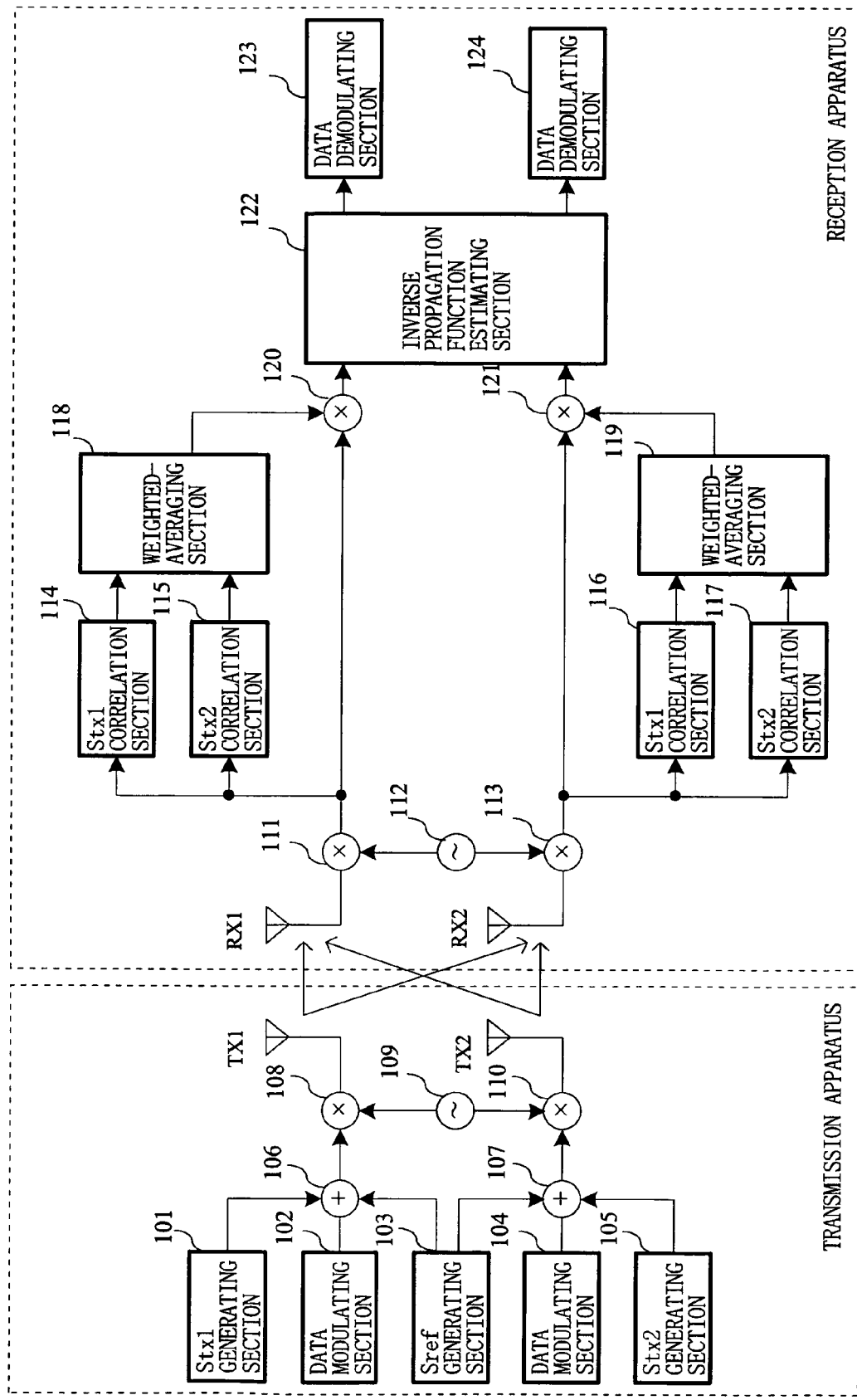
FIG. 1 is a block diagram illustrating an exemplary structure of a transfer apparatus according to a first embodiment of the present invention.

TX1, TX2 transmission antenna
RX1, RX2 reception antenna
101, 105 synchronization subsymbol generating section
102, 104, 502, 504 data modulating section
103 propagation coefficient estimation symbol generating section
106, 107 multiplexer
108, 110 orthogonal modulation section
109 transmission local oscillator
112 reception local oscillator
111, 113 orthogonal demodulation section
114 to 117 synchronization subsymbol correlation section
118, 119, 203 weighted-averaging section
120, 121 frequency correcting section
122, 322, 522 inverse propagation function estimating section
123, 124 data demodulating section
201, 202 synchronization symbol correlation section
204, 205 frequency correcting section
301 to 304 propagation coefficient rough estimation section
401, 402 reception level determining section
403, 404 selection combination section
5021, 5041 data carrier mapping section
5022, 5042 pilot carrier generating section
5023, 5043 orthogonal multiplexing section
5221, 5222 orthogonal separation section
5223 propagation path characteristics estimating section
5224 to 5227 PC extracting section
5228 to 5231 propagation path coefficient rough estimation section
5232 propagation path characteristics updating section
5233 inverse propagation path function calculating section
5234 channel separating section

BEST MODE FOR CARRYING OUT THE INVENTION

First Embodiment

FIG. 1 is a block diagram illustrating an exemplary structure of a transfer apparatus according to a first embodiment of the present invention. Here, the transfer apparatus has two transmission antennas and two reception antennas (i.e., a 2×2 MIMO structure).

In FIG. 1, the transfer apparatus of the first embodiment of the present invention is composed of a transmission apparatus and a reception apparatus. The transmission apparatus comprises transmission antennas TX1 and TX2, synchronization subsymbol generating sections 101 and 105, data modulating sections 102 and 104, a propagation coefficient estimation symbol generating section 103, multiplexers 106 and 107, orthogonal modulation sections 108 and 110, and a transmission local oscillator 109. The reception apparatus comprises reception antennas RX1 and RX2, orthogonal demodulation sections 111 and 113, a reception local oscillator 112, synchronization subsymbol correlation sections 114 to 117, weighted-averaging sections 118 and 119, frequency correcting sections 120 and 121, an inverse propagation function estimating section 122, and data demodulating sections 123 and 124.

In the transmission apparatus, the transmission antennas TX1 and TX2 are antennas for transmitting radio signals. The synchronization subsymbol generating sections 101 and 105 generate synchronization subsymbols Stx which are different among the transmission antennas. The data modulating sections 102 and 104 modulate data sequences which are different among the transmission antennas, and output the results as data symbol sequences. The propagation coefficient estimation symbol generating section 103 generates a symbol for estimating an inverse function of a propagation coefficient (hereinafter referred to as a propagation coefficient estimation symbol Sref). The multiplexers 106 and 107 multiplex the synchronization subsymbols Stx, the propagation coefficient estimation symbol Sref, and the data symbol sequences, and output the results as transfer frames. The transmission local oscillator 109 is an oscillator for holding synchronization between the multiplexer 106 and the multiplexer 107.

In the reception apparatus, the reception antennas RX1 and RX2 are antennas for receiving radio signals. The orthogonal demodulation sections 111 and 113 demodulate the radio signals received via the reception antennas and output the results as received signals. The reception local oscillator 112 is an oscillator for holding synchronization between the orthogonal demodulation section 111 and the orthogonal demodulation section 113. The synchronization subsymbol correlation sections 114 to 117 obtain correlations between the received signals and the synchronization subsymbols Stx to estimate frequency errors for respective transfer path. The weighted-averaging sections 118 and 119 calculate weighted averages of the frequency errors of the respective transfer paths to calculate frequency correction values for the respective reception antennas. The frequency correcting sections 120 and 121 correct frequencies of the received signals based on the calculated frequency correction values. The inverse propagation function estimating section 122 separates data sequences transmitted by the transmission antenna from the received signals based on the propagation coefficient estimation symbols Sref contained in the frequency-corrected received signals. The data demodulating sections 123 and 124 demodulate the data sequences separated by the inverse propagation function estimating section 122.

Hereinafter, operations of the transmission apparatus and the reception apparatus included in the transfer apparatus of the first embodiment will be described.

[Operation of Transmission Apparatus]

Figure 2:
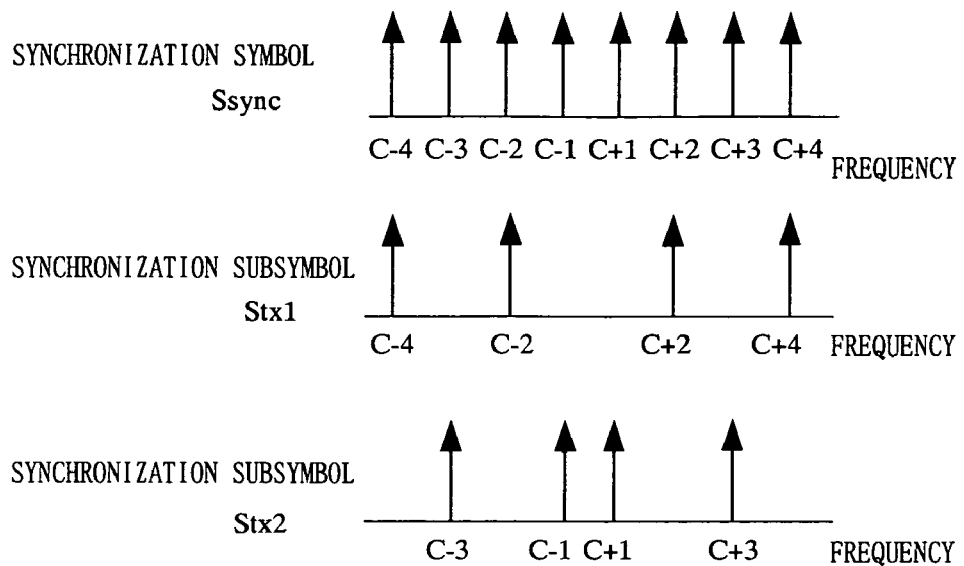
FIG. 2 is a diagram for explaining synchronization subsymbols Stx1 and Stx2.

In the transmission apparatus, the synchronization subsymbol generating sections 101 and 105 generate the synchronization subsymbols Stx which are different among the transmission antennas. Specifically, the synchronization subsymbol generating section 101 generates a synchronization subsymbol Stx1 for the transmission antenna TX1. The synchronization subsymbol generating section 105 generates a synchronization subsymbol Stx2 for the transmission antenna TX2. FIG. 2 is a diagram for explaining the synchronization subsymbols Stx1 and Stx2.

Referring to FIG. 2, the synchronization subsymbols Stx1 and Stx2 are composed of predetermined subcarriers extracted from a plurality of subcarriers contained in a synchronization symbol Ssync. The synchronization symbol Ssync is composed of a plurality of subcarriers which are spaced at predetermined subcarrier frequency intervals and are orthogonal to each other. A predetermined amplitude and phase are assigned to each subcarrier. The synchronization symbol Ssync has a property that, when these subcarriers are orthogonally multiplexed by Fourier transform or the like to be transformed into a signal represented on a time axis, a repeating waveform appears in temporal cycles which are an inverse of the above-described predetermined frequency interval.

The synchronization subsymbol generating sections 101 and 105 divide a plurality of subcarriers constituting the synchronization symbol Ssync into groups the number of which is the transmission antenna number N. For example, the synchronization subsymbol generating section 101 assigns even-numbered subcarriers as symbols to be transmitted from the transmission antenna TX1, which are in turn subjected to orthogonal multiplexing by Fourier transform or the like, to generate the synchronization subsymbol Stx1. The synchronization subsymbol generating section 105 assigns odd-numbered subcarriers as symbols to be transmitted from the transmission antenna TX2, which are in turn subjected to orthogonal multiplexing by Fourier transform or the like, to generate the synchronization subsymbol Stx2. The synchronization subsymbols Stx1 and Stx2 are different from each other in the positions of the subcarriers, and are orthogonal in the frequency domain. Therefore, even if the synchronization subsymbols Stx1 and Stx2 are multiplexed in space, they can be easily separated. Also in the synchronization subsymbols Stx1 and Stx2, a repeating waveform appears in temporal cycles which are an inverse of the above-described predetermined frequency interval. Therefore, the reception apparatus can estimate a carrier frequency error based on the repeating waveform.

The data modulating section 102 modulates data to be transmitted from the transmission antenna TX1 (hereinafter referred to as a data sequence 1) to output a data symbol sequence 1. The data modulating section 104 modulates a data sequence to be transmitted from the transmission antenna TX2 (hereinafter referred to as a data sequence 2) to output a data symbol sequence 2.

The propagation coefficient estimation symbol generating section 103 generates propagation coefficient estimation symbols Sref. The propagation coefficient estimation symbols Sref are symbols which are orthogonal between transmission antennas in order to estimate a propagation coefficient inverse function for each transfer path. When the symbol transmitted from the transmission antenna TX1 is represented by Seref1 and the symbol transmitted by the transmission antenna TX2 is represented by Sref2, the propagation coefficient estimation symbol generating section 103 outputs Sref as Seref1 and no symbol as Sref2 at, for example, a certain time T1. The propagation coefficient estimation symbol generating section 103 outputs no symbol as Seref1 and Sref as Sref2 at another time T2. Thereby, the propagation coefficient estimation symbol generating section 103 can cause Seref1 and Sref2 to be temporally orthogonal to each other.

Figure 3:
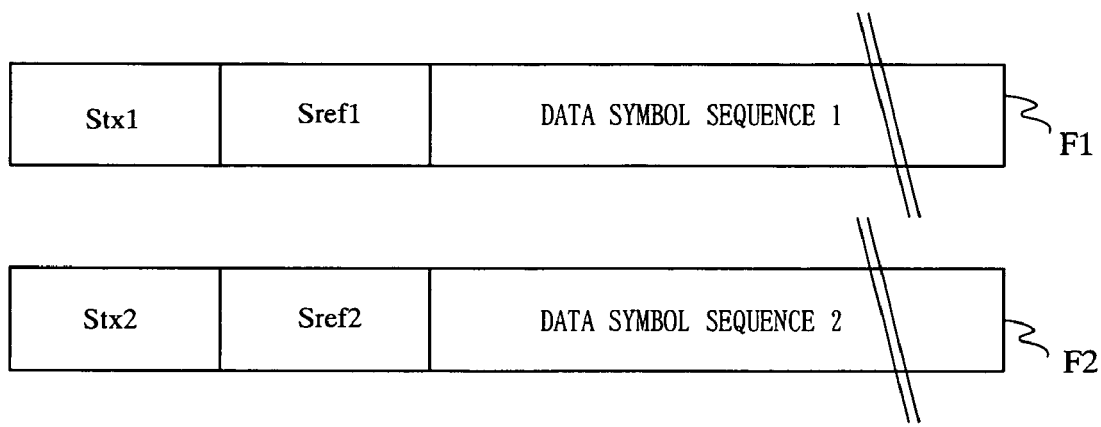
FIG. 3 is a diagram illustrating exemplary transfer frames.

The data symbol sequence 1, the propagation coefficient estimation symbol Seref1, and the synchronization subsymbol Stx1 are input to the multiplexer 106. The data symbol sequence 2, the propagation coefficient estimation symbol Sref2, and the synchronization subsymbol Stx2 are input to the multiplexer 107. The multiplexer 106 multiplexes the received data symbol sequence 1, propagation coefficient estimation symbol Seref1, and synchronization subsymbol Stx1 to generate a transfer frame F1. Similarly, the multiplexer 107 multiplexes the received data symbol sequence 2, propagation coefficient estimation symbol Sref2, and synchronization subsymbol Stx2 to generate a transfer frame F2. FIG. 3 is a diagram illustrating exemplary transfer frames generated by the multiplexers 106 and 107. Referring to FIG. 3, in the transfer frames, the synchronization subsymbol Stx and the propagation coefficient estimation symbol Sref are inserted before the data symbol sequence.

The transfer frame F1 is converted into a radio signal by the orthogonal modulation section 108 and the transmission local oscillator 109. The transfer frame F2 is converted into a radio signal by the orthogonal modulation section 110 and the transmission local oscillator 109. The transfer frame F1 and the transfer frame F2 which have been converted into radio signals are simultaneously transmitted from the transmission antenna TX1 and the transmission antenna TX2.

Figure 4:
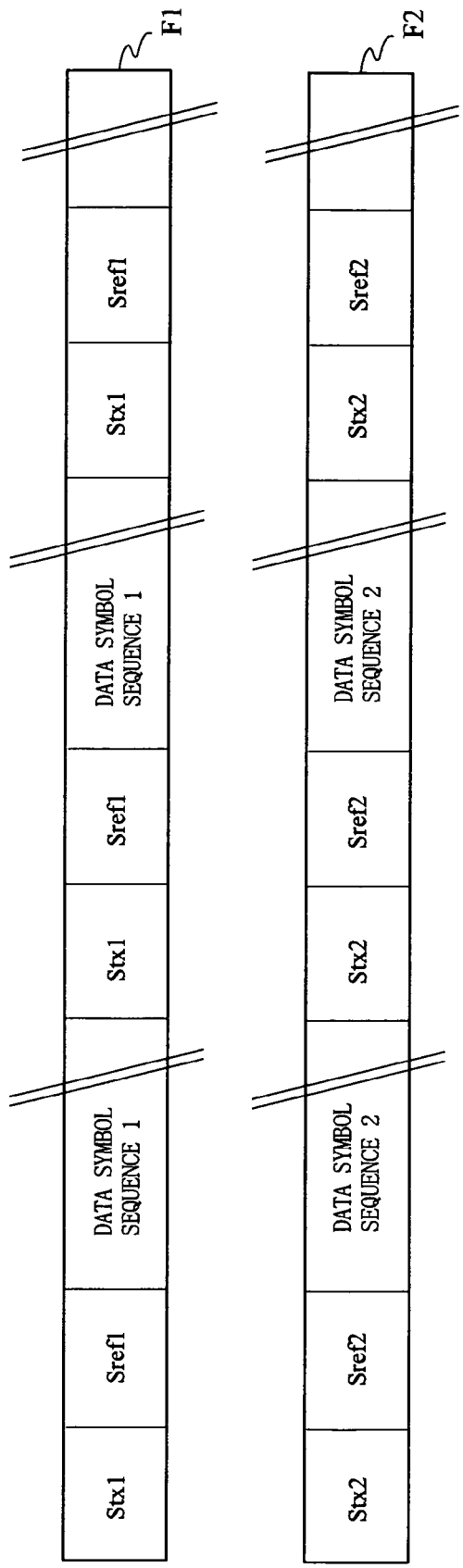
FIG. 4 is a diagram illustrating exemplary transfer frames generated by multiplexers 106 and 107.

Although the synchronization subsymbol Stx and the propagation coefficient estimation symbol Sref are inserted before the data symbol sequence in the transfer frame in FIG. 3, either or both of the synchronization subsymbol Stx and the transmission coefficient estimation symbol Sref may be inserted in the data symbol sequence at predetermined intervals. FIG. 4 is a diagram illustrating exemplary transfer frames in which both Stx and Sref are inserted in the data symbol sequence. With such a transfer frame, even when temporal variation occurs in propagation characteristics, the transfer apparatus can follow the temporal variation by reestimating the propagation characteristics using these symbols inserted at the predetermined intervals. Thereby, the transfer apparatus can suppress a degradation in reception characteristics even when temporal variation occurs in the propagation characteristics.

Figure 5:
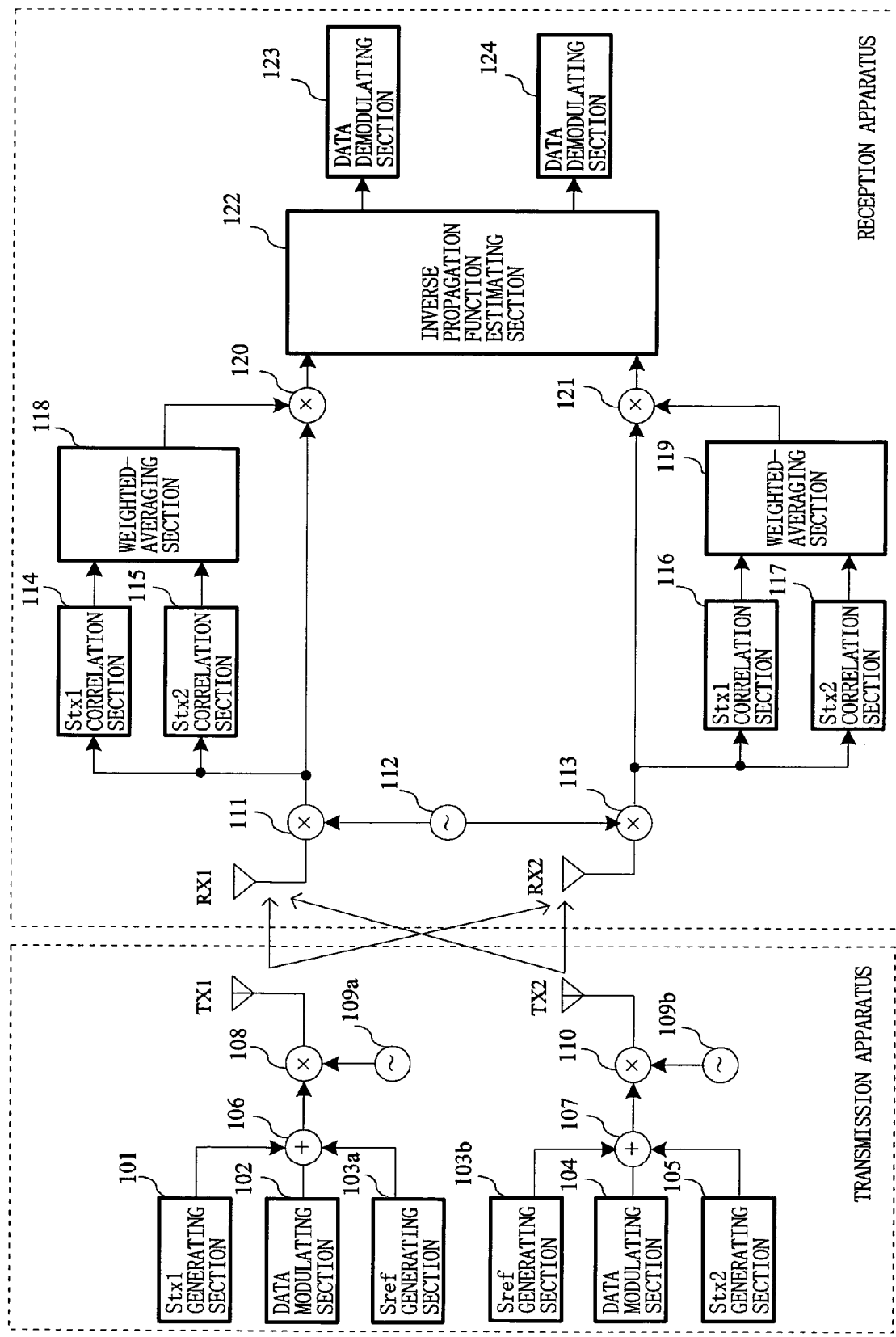
FIG. 5 is a block diagram illustrating an exemplary structure of a transfer apparatus which employs local oscillators which are different among transmission antennas.

The transmission apparatus may employ transmission local oscillators which are different among the transmission antennas. FIG. 5 is a block diagram illustrating an exemplary structure of a transfer apparatus which employs local oscillators which are different among transmission antennas. Referring to FIG. 5, the transmission apparatus comprises a local oscillator 109a for the transmission antenna TX1 and a local oscillator 109b for the transmission antenna TX2. Such a transmission apparatus can have a degree of freedom of arrangement of transmission antennas. The transfer apparatus including such a transmission apparatus can reduce a correlation between transfer paths by some arrangement of the transmission antennas, thereby making it possible to effectively performing space multiplexing. In addition, using a single transmission local oscillator, not only high-frequency parts specialized for MIMO which perform transmission from a plurality of antennas, but also general high-frequency parts, can be used.

[Operation of Reception Apparatus]

Radio signals simultaneously transmitted from the transmission antennas TX1 and TX2 are received via a plurality of space paths by the reception antennas RX1 and RX2. A signal received by the reception antenna RX1 (hereinafter referred to as a received signal R1) is demodulated by the orthogonal demodulation section 111 and the reception local oscillator 112, and is then input into the synchronization subsymbol correlation sections 114 and 115 and the frequency correcting section 120. Similarly, a signal received by the reception antenna RX2 (hereinafter referred to as a received signal R2) is demodulated by the orthogonal demodulation section 113 and the reception local oscillator 112, and is then input to the synchronization subsymbol correlation sections 116 and 117 and the frequency correcting section 121.

Here, a transfer path between the transmission antenna TXi and the reception antenna RXj is represented by p (i, j), and a propagation coefficient possessed by the transfer path p (i, j) is represented by h (i, j). In this case, a synchronization subsymbol received by the reception antenna RXi can be represented by h (1, 1) Stx1+h (2, 1) Stx2, since the transmission antenna TX1 transmits the synchronization subsymbol Stx1 and the transmission antenna TX2 transmits the synchronization subsymbol Stx2, where i is a transmission antenna number and j is a reception antenna number.

Specifically, since Stx1 and Stx2 are orthogonal to each other, when a correlation is calculated between a received signal of RX1 and Stx1, the terms of Stx2 are zero, and therefore, based on Stx1, the synchronization subsymbol correlation section 114 can estimate information about the transfer path p (1, 1). Similarly, when a correlation is calculated between the received signal and Stx2, the terms of Stx1 are zero, and therefore, based on Stx2, the synchronization subsymbol correlation section 115 can estimate information about the transfer path p (2, 1).

Figure 6:
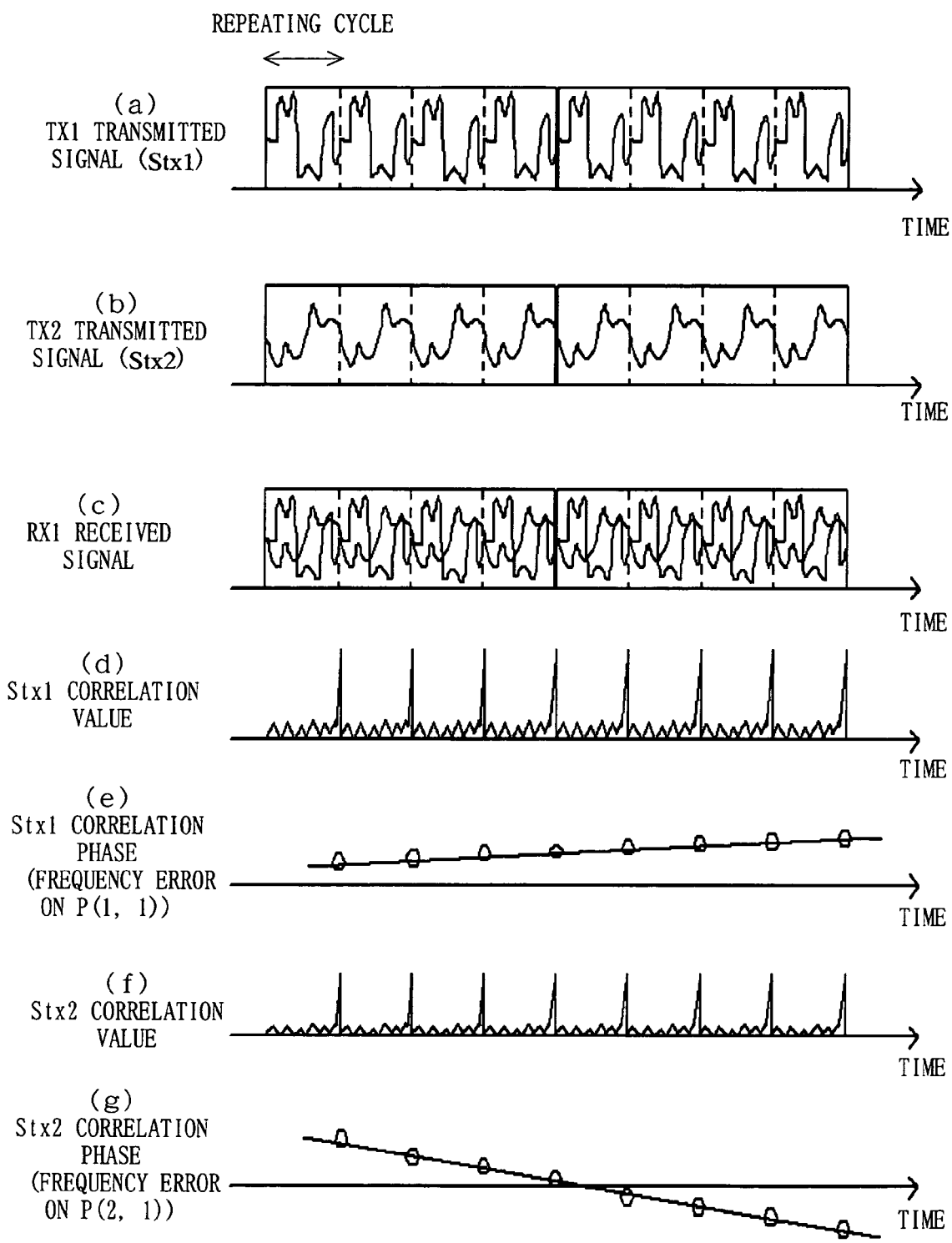
FIG. 6 is a diagram for explaining detailed operations of synchronization subsymbol correlation sections 114 and 115.

FIG. 6 is a diagram for explaining detailed operations of the synchronization subsymbol correlation sections 114 and 115. Referring to FIGS. 6(a) and (b), in the synchronization subsymbols Stx1 and Stx2 transmitted from TX1 and TX2, a repeating waveform having a predetermined cycle appears as described above. In FIG. 6 (c), a received signal of the reception antenna RX1 is illustrated (hereinafter referred to as an RX1 received signal). The synchronization subsymbol correlation sections 114 and 115 calculate a complex correlation between the repeating waveforms of the synchronization subsymbols Stx1 and Stx2 and the RX1 received signal. Referring to FIG. 6(d), in a correlation value between the RX1 received signal and Stx1 (hereinafter referred to as an Stx1 correlation value), a peak of the complex correlation value appears at timing that the RX1 received signal matches the repeating wave form of Stx1. Referring to FIG. 6(e), when a carrier frequency error occurs, the phase of the correlation value changes every correlation peak timing, and therefore, based on the amount of the change, the synchronization subsymbol correlation section 114 can estimate a carrier frequency error which occurs in the transfer path p (1, 1).

Referring to FIGS. 6(f) and (g), in a similar manner, the synchronization subsymbol correlation section 115 estimates a carrier frequency error which occurs in the transfer path p (2, 1). In a similar manner, the synchronization subsymbol correlation sections 116 and 117 also calculate complex correlations between the repeating waveforms of the synchronization subsymbols Stx1 and Stx2 and the received signal R2 to estimate carrier frequency errors which occur in the transfer paths p (1, 2) and p (2, 2).

The synchronization subsymbol correlation sections 114 to 117 can calculate an Stx correlation value by cross-correlation calculation between the repeating waveform of Stx and the received signal. Alternatively, the synchronization subsymbol correlation sections 114 to 117 may extract some subcarriers included in Stx using a single-frequency DFT, and based on an average of phase changes in the extracted subcarriers, calculate the Stx correlation value. In such a case, the transmission apparatus repeatedly transmits Stx, and in the reception apparatus, the synchronization subsymbol correlation sections 114 to 117 calculate the correlations of the repeating waveform. If correlation peaks of the repeating waveform can be detected at predetermined intervals with a predetermined number of times, the synchronization subsymbol correlation sections 114 to 117 may calculate a correlation of an Stx length with respect to an Stx sequence subsequently received. The synchronization subsymbol correlation sections 114 to 117 can detect a phase difference between the transmitter and the receiver with higher precision by elongating such a correlation calculation time period.

The carrier frequency errors for the respective transfer paths obtained by the synchronization subsymbol correlation sections 114 to 117 are input to the weighted-averaging sections 118 and 119. The weighted-averaging section 118 weighted-averages the carrier frequency errors of the transfer paths p (1, 1) and p (2, 1) to calculate a frequency correction value with respect to the reception antenna RX1. Similarly, the weighted-averaging section 119 weighted-averages the carrier frequency errors of the transfer paths p (1, 2) and p (2, 2) to calculate a frequency correction value with respect to the reception antenna RX2.

The weighted-averaging sections 118 and 119 apply a weight in proportion to a correlation amount of each synchronization subsymbol Stx. Alternatively, the subsequent-stage data demodulating sections 123 and 124 may calculate a reception error rate for each transmission antenna. Based on the error rate, the weighted-averaging sections 118 and 119 apply a smaller weight to a signal received via a transfer path having frequent errors (i.e., a poor propagation path).

When synchronization subsymbols are inserted at predetermined intervals in a transfer frame (see FIG. 4), the weighted-averaging sections 118 and 119 may average a carrier frequency error previously estimated and a carrier frequency error estimated from a current synchronization subsymbol. Such a transfer apparatus can follow a temporal variation in carrier frequency error while suppressing a significant variation in frequency correction value due to an estimation error caused by noise or the like, thereby making it possible to improve the precision of estimation of an inverse propagation coefficient function.

Based on the frequency correction value for each reception antenna calculated by the weighted-averaging sections 118 and 119, the frequency correcting sections 120 and 121 correct frequencies of the received signals R1 and R2. The inverse propagation function estimating section 122 extracts the propagation coefficient estimation symbols Sref from the frequency-corrected received signals R1 and R2, and estimates an inverse propagation coefficient function for each transfer path to perform equalization which cancels an interference component, thereby separating data symbol sequences transmitted from the transmission antennas TX1 and TX2. Specifically, data transmitted from the transmission antenna TX1 is separated as a data symbol sequence 1. Data transmitted from the transmission antenna TX2 is separated as a data symbol sequence 2. The separated data symbol sequence 1 is demodulated into a data sequence 1 in the data demodulating section 123. Similarly, the separated data symbol sequence 2 is demodulated into a data sequence 2 in the data demodulating section 124.

Note that the reception apparatus detects a propagation delay occurring in each transfer path from correlation peak timings obtained in the synchronization subsymbol correlation sections 114 to 117, thereby making it possible to establish rough frame synchronization. The reception apparatus weighted-averages these correlation peak timings, depending on their correlation amounts, and based on the result, generates symbol timings, thereby making it possible to suppress intersymbol interference during extraction of Sref in the inverse propagation function estimating section 122.

The reception apparatus may employ reception local oscillators which are different among the reception antennas. By using a plurality of reception local oscillators, the reception apparatus can have a degree of freedom of arrangement of the reception antennas. In a transfer apparatus including such a reception apparatus, a correlation between transfer paths can be reduced by some arrangement of the reception antennas, thereby making it possible to effectively perform space multiplexing. In addition, using a single reception local oscillator, not only high-frequency parts specialized for MIMO which perform reception from a plurality of antennas, but also general high-frequency parts, can be used.

As described above, according to the transmission apparatus of the first embodiment of the present invention, a synchronization symbol in which predetermined amplitudes and phases are assigned to a plurality of subcarriers spaced at predetermined frequency intervals are divided into a plurality of transmission antennas, thereby making it possible to simultaneously transmit a plurality of synchronization subsymbols which are orthogonal to each other, from a plurality of transmission antennas. According to the reception apparatus, by calculating a correlation between a synchronization subsymbol included in a received signal and the received signal, it is possible to estimate a carrier frequency error and a propagation delay occurring in each transfer path. Thereby, the transfer apparatus weighted-averages these estimated errors for each reception antenna to correct a received signal, thereby improving the precision of estimation of an inverse propagation coefficient function.

Second Embodiment

A transfer apparatus according to a second embodiment is different from that of the first embodiment (see FIG. 1) in a structure of the reception apparatus. In the transfer apparatus of the first embodiment, when there is a large frequency error between the transmission local oscillator 109 and the reception local oscillator 112, there is a possibility that the synchronization subsymbol correlation sections 114 to 117 cannot correctly calculate correlations. Particularly, when single-frequency DFT is used for the correlation calculation, the synchronization subsymbol correlation sections 114 to 117 cannot correctly extract subcarriers if a deviation corresponding to ½ or more of a frequency bin interval of Fourier transform occurs in a frequency error. Therefore, the reception apparatus of the second embodiment corrects in advance an average frequency error between the transmission and reception local oscillators.

Figure 7:
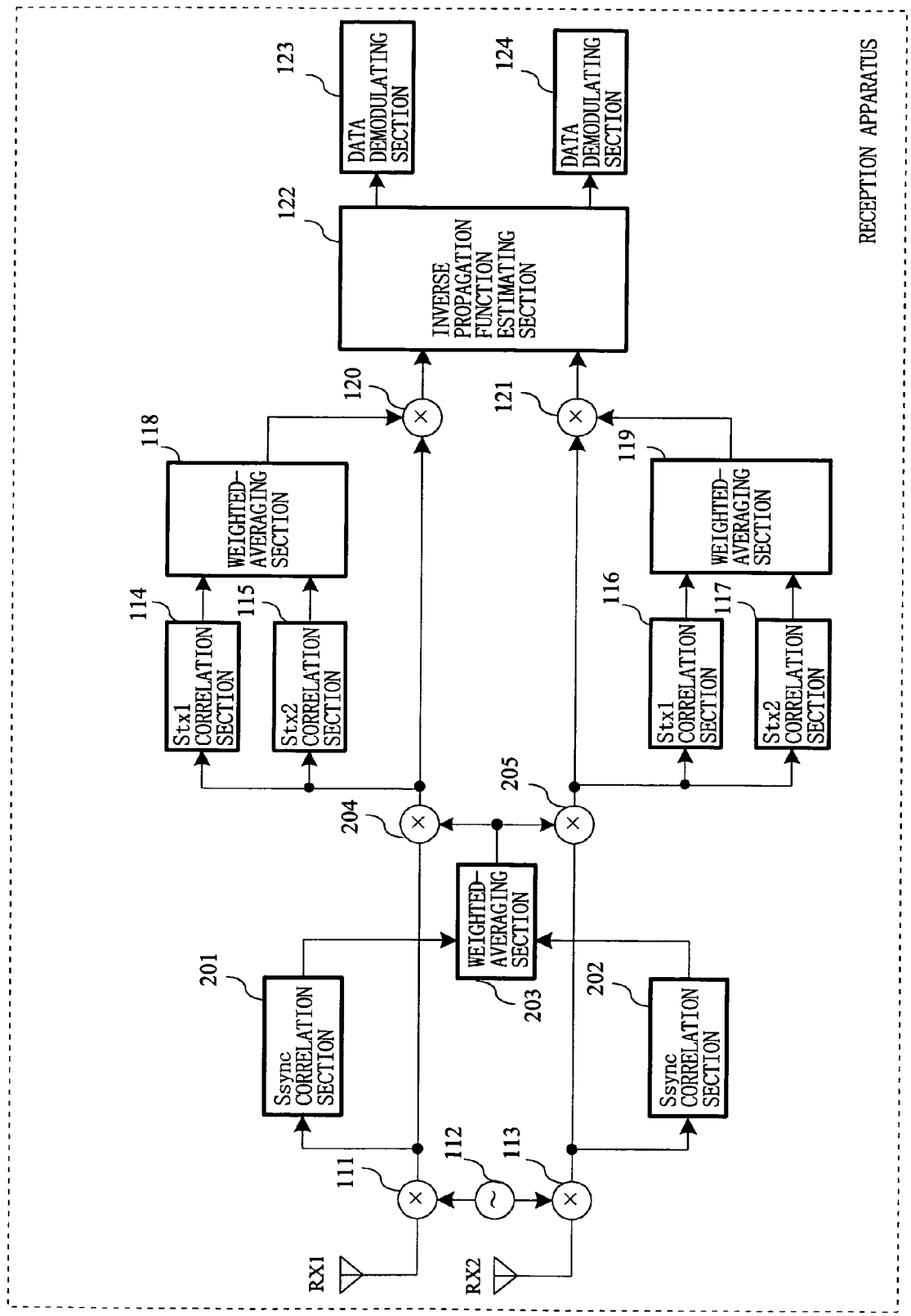
FIG. 7 is a block diagram illustrating an exemplary structure of a reception apparatus according to a second embodiment of the present invention.

FIG. 7 is a block diagram illustrating an exemplary structure of the reception apparatus of the second embodiment of the present invention. In the second embodiment, the same constituents as those of the first embodiment are indicated with the same reference characters and will not be explained. In FIG. 7, the reception apparatus of the second embodiment is different from that of the first embodiment in that synchronization symbol correlation sections 201 and 202, a weighted-averaging section 203, and frequency correcting section 204 and 205 are further included in the reception apparatus of the second embodiment.

The synchronization symbol correlation section 201 combines synchronization subsymbols Stx1 and Stx2 included in signals received by the reception antenna RX1 to generate a synchronization symbol Ssync. The synchronization symbol Ssync has a repeating waveform having a predetermined cycle as described above. Therefore, the synchronization symbol correlation section 201 can calculate an average frequency error occurring in the reception antenna RX1 from correlations between the received signals and the repeating waveform of the synchronization symbol Ssync. Similarly, the synchronization symbol correlation section 202 can calculate an average frequency error occurring in the reception antenna RX2.

The weighted-averaging section 203 weighted-averages the frequency errors of the reception antennas calculated by the synchronization symbol correlation sections 201 and 202, to obtain a frequency correction value with respect to the received signals. In this case, the weighted-averaging section 203 may apply a weight in proportion to a correlation amount of each synchronization symbol Ssync. Alternatively, the weighted-averaging section 203 may apply a weight in proportion to a level of the signal received by each reception antenna.

The frequency correcting sections 204 and 205 correct a frequency of the received signal for each reception antenna to cancel a frequency error between the transmission and reception local oscillators, based on the frequency correction value obtained in the weighted-averaging section 203.

Figure 8:
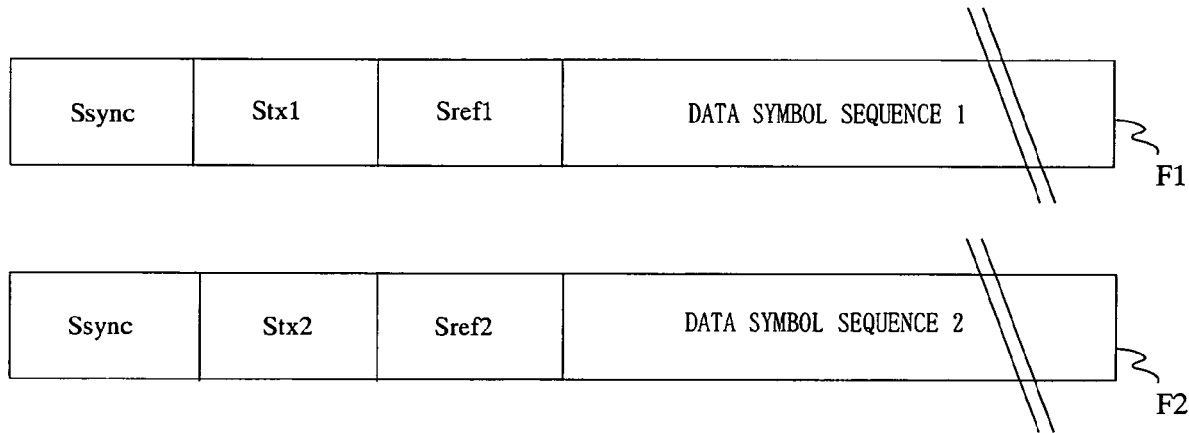
FIG. 8 is a diagram illustrating an exemplary transfer frame in which a synchronization symbol Ssync is inserted.

Although the same transfer frame as that of the first embodiment (see FIG. 3) is used in the transfer apparatus of the second embodiment, a transfer frame in which the synchronization symbol Ssync may be inserted in advance before the synchronization subsymbol Stx may be used. FIG. 8 is a diagram illustrating an exemplary transfer frame in which the synchronization symbol Ssync is inserted. By using such a transfer frame, the transfer apparatus of the second embodiment can transmit all subcarriers included in the synchronization symbol Ssync from a plurality of antennas. Thereby, the transfer apparatus can detect a correlation of the synchronization symbol Ssync with high precision even if a reception level is low in a certain transfer path.

As described above, according to the reception apparatus of the second embodiment of the present invention, an average frequency error with respect to a plurality of reception antennas can be estimated by calculation of a correlation between a received signal and a synchronization symbol Ssync which are received by each reception antenna. Thereby, the transfer apparatus can cancel a frequency error between transmission and reception local oscillators, thereby making it possible to more correctly perform subsequent-stage synchronization subsymbol correlation calculation.

Third Embodiment

Figure 9:
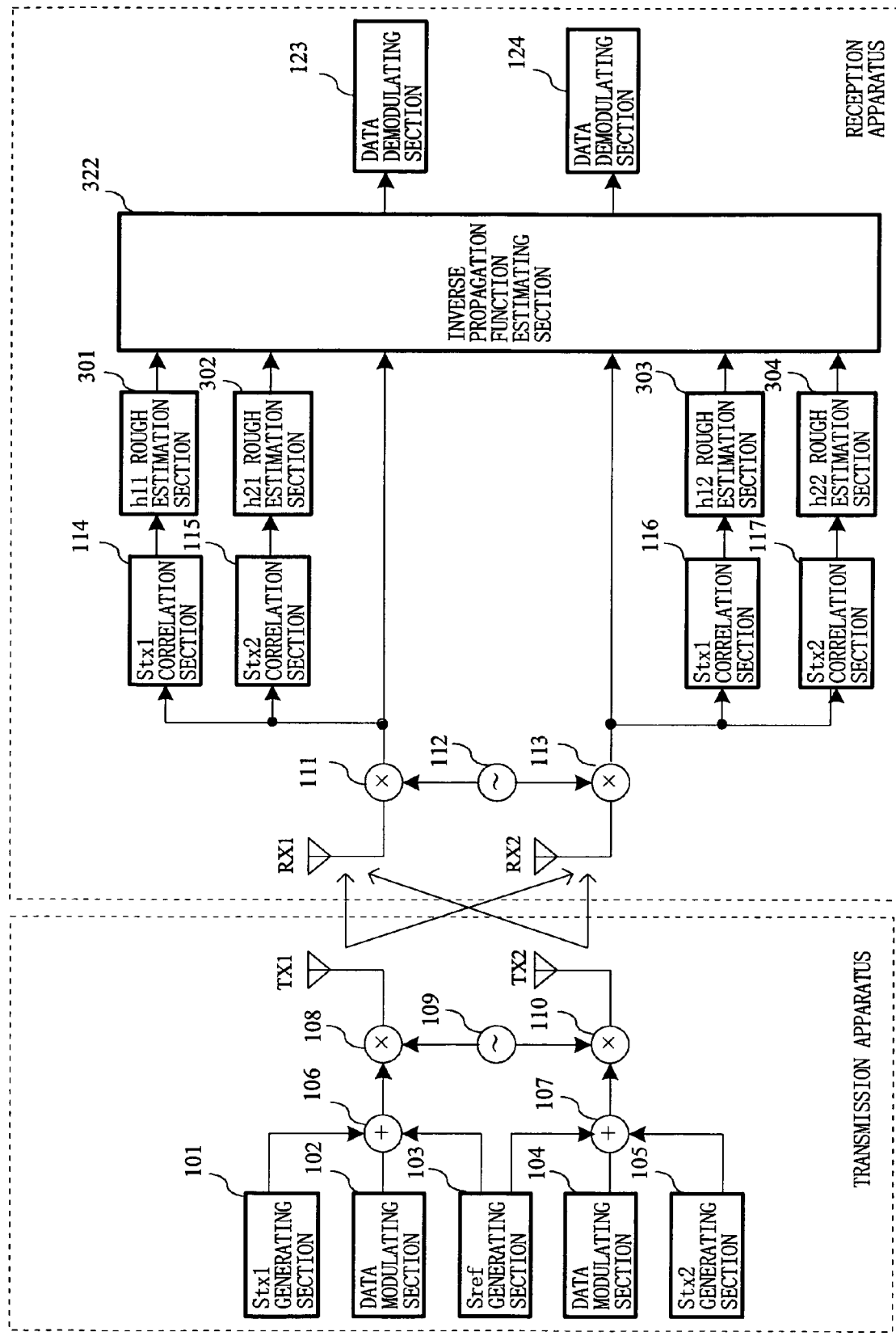
FIG. 9 is a block diagram illustrating an exemplary structure of a transfer apparatus according to a third embodiment of the present invention.

FIG. 9 is a block diagram illustrating an exemplary structure of a transfer apparatus according to a third embodiment of the present invention. In the third embodiment, the same constituents as those of the first embodiment are indicated with the same reference characters and will not be explained. The transfer apparatus of the third embodiment is different from that of the first embodiment (see FIG. 1) in that a structure of the reception apparatus. In FIG. 9, the reception apparatus of the third embodiment comprises reception antennas RX1 and RX2, orthogonal demodulation sections 111 and 113, a reception local oscillator 112, synchronization subsymbol correlation sections 114 to 117, propagation coefficient rough estimation sections 301 to 304, an inverse propagation function estimating section 322, and data demodulating sections 123 and 124.

The synchronization subsymbol correlation sections 114 to 117 can estimate information about each transfer path from a correlation between a received signal and a synchronization subsymbol Stx as described above. The synchronization subsymbol correlation sections 114 to 117 can obtain a phase and an amplitude of each subcarrier, when a subcarrier included in a synchronization subsymbol is extracted by single-frequency DFT or the like.

Figure 10:
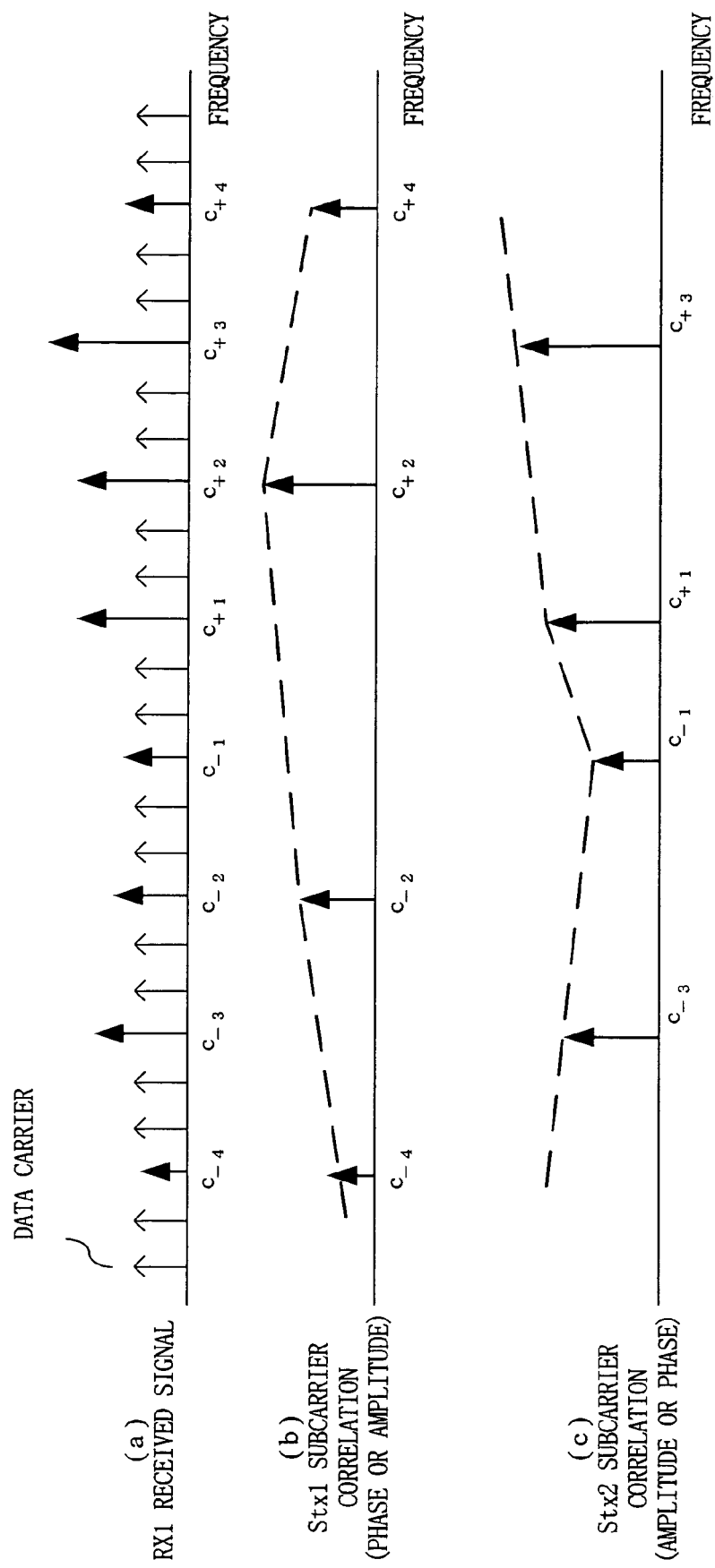
FIG. 10 is a diagram for explaining operations of propagation coefficient rough estimation sections 301 to 304.

FIG. 10 is a diagram for explaining operations of the propagation coefficient rough estimation sections 301 to 304. Note that, in FIG. 10(a), a thin arrow indicates a space-multiplexed subcarrier of an OFDM-modulated data symbol sequence (i.e., a data carrier). The synchronization subsymbol correlation section 114 extracts only subcarriers included in Stx1 from a received signal of RX1 (see FIG. 10(a)), and calculates a phase and an amplitude of each extracted subcarrier. The propagation coefficient rough estimation section 301 interpolates phase-amplitude characteristics between adjacent subcarriers based on the phases and amplitudes of subcarriers included in Stx1, thereby making it possible to roughly estimate frequency characteristics of the transfer path p (1, 1) (see FIG. 10(b)).

Similarly, the propagation coefficient rough estimation section 302 interpolates phase-amplitude characteristics between adjacent subcarriers based on the phases and amplitudes of subcarriers included in Stx2, thereby making it possible to roughly estimate frequency characteristics of the transfer path p (2, 1) (see FIG. 10(c)).

A data carrier received by the reception apparatus (see FIG. 10 (a)) has a combination of the characteristics of these two transfer paths p (1, 1) and p (2, 1). Thereby, the propagation coefficient rough estimation sections 301 to 304 roughly calculate, in advance, the frequency characteristics of the transfer paths using the synchronization subsymbol Stx. The inverse propagation function estimating section 322 more precisely estimates a propagation coefficient inverse function based on the rough frequency characteristics.

As described above, according to the reception apparatus of the third embodiment of the present invention, it is possible to use the synchronization subsymbol Stx to roughly estimate the frequency characteristics of each transfer path in advance. Thereby, the transfer apparatus can improve the precision of subsequent-stage estimation of an inverse propagation coefficient function.

Note that the technique of using the propagation coefficient rough estimation sections 301 to 304 described in the third embodiment can be combined with the first to second embodiments.

Fourth Embodiment

A transfer apparatus according to a fourth embodiment is different from that of the first embodiment (see FIG. 1) in a structure of the reception apparatus. In the reception apparatus of the first embodiment, in the frequency selective fading environment, the reception level of a specific subcarrier decreases, resulting in a possibility that a correlation is not correctly calculated in the synchronization subsymbol correlation sections 114 to 117. Particularly, in the case of a synchronization subsymbol in which the number of subcarriers is small, the influence is significant when the reception level of a certain subcarrier decreases. Therefore, in the reception apparatus of the fourth embodiment, a plurality of reception antennas are provided for each reception system, thereby reducing an influence of frequency selective fading by means of reception diversity.

Figure 11:
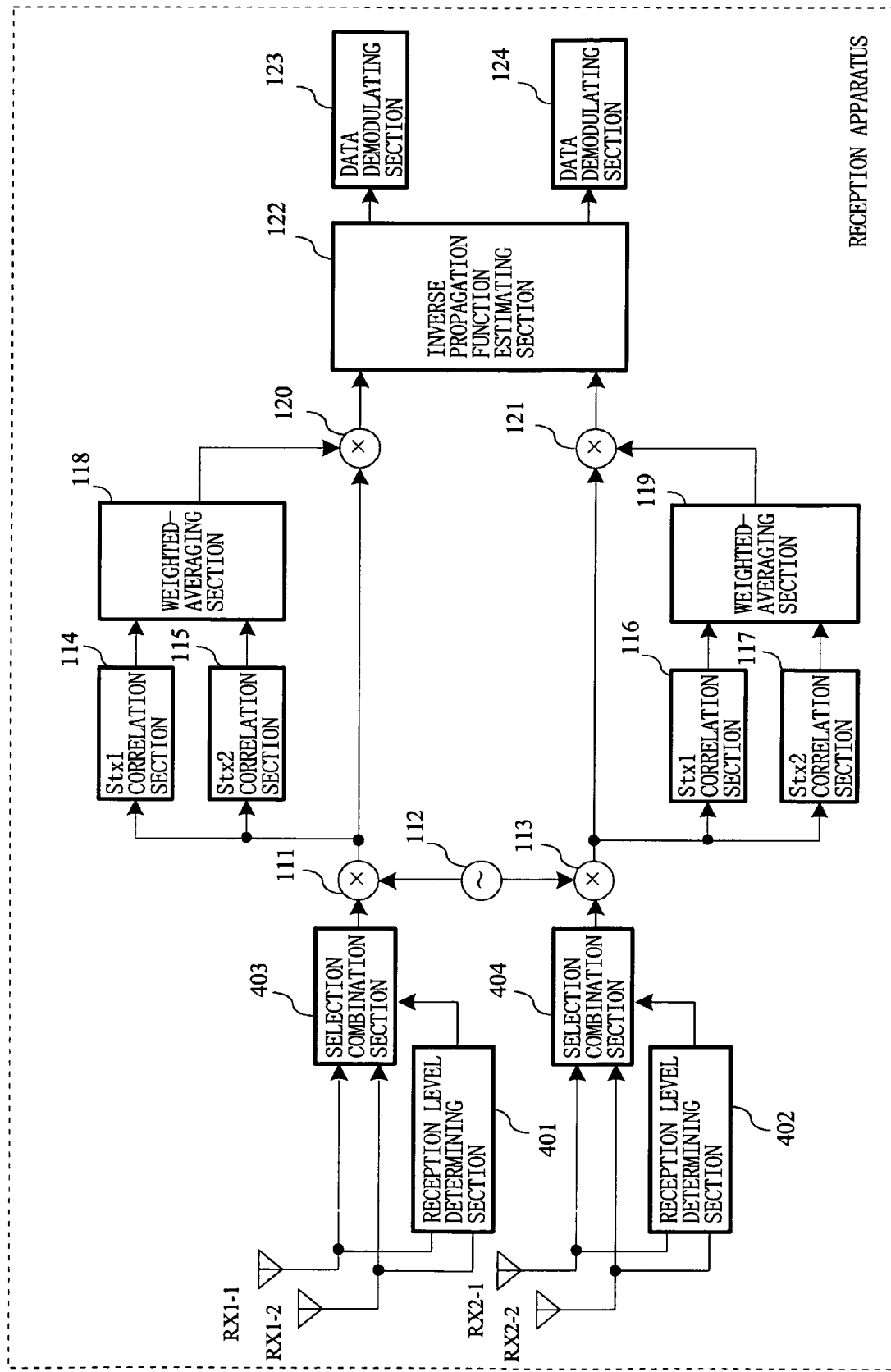
FIG. 11 is a block diagram illustrating an exemplary structure of a reception apparatus according to a fourth embodiment of the present invention.

FIG. 11 is a block diagram illustrating an exemplary structure of a reception apparatus according to a fourth embodiment of the present invention. In the fourth embodiment, the same constituents as those of the first embodiment are indicated with the same reference characters and will not be explained.

In FIG. 11, the reception apparatus of the fourth embodiment is different from that of the first embodiment in that the reception apparatus of the fourth embodiment comprises reception antennas RX1-1, RX1-2, RX2-1, and RX2-2, reception level determining sections 401 and 402, and selection combination sections 403 and 404, in place of the reception antennas RX1 and RX2.

In the reception apparatus, the reception antennas RX1-1 and RX1-2 are a plurality of antennas provided in a reception system 1. The reception level determining section 401 compares reception levels of received signals of the plurality of reception antennas. The selection combination section 403 selects or combines the received signals of the plurality of antennas based on the comparison result of the reception level determining section 401. For example, the selection combination section 403 selects the received signal of RX1-1 when the reception level of RX1-1 is higher than the reception level of RX1-2. Alternatively, the selection combination section 403 may combine a received signal based on a ratio of the reception level of RX1-1 to the reception level of RX1-2. Alternatively, the selection combination section 403 may select one of the received signals in which a subcarrier included in a synchronization subsymbol has a level which is not larger than or equal to a predetermined level, based on output results of the synchronization subsymbol correlation sections 114 and 115.

Also in a reception system 2, the reception level determining section 402 and the selection combination section 404 select or combine received signals of the plurality of reception antennas RX2-1 and RX2-2.

Figure 12:
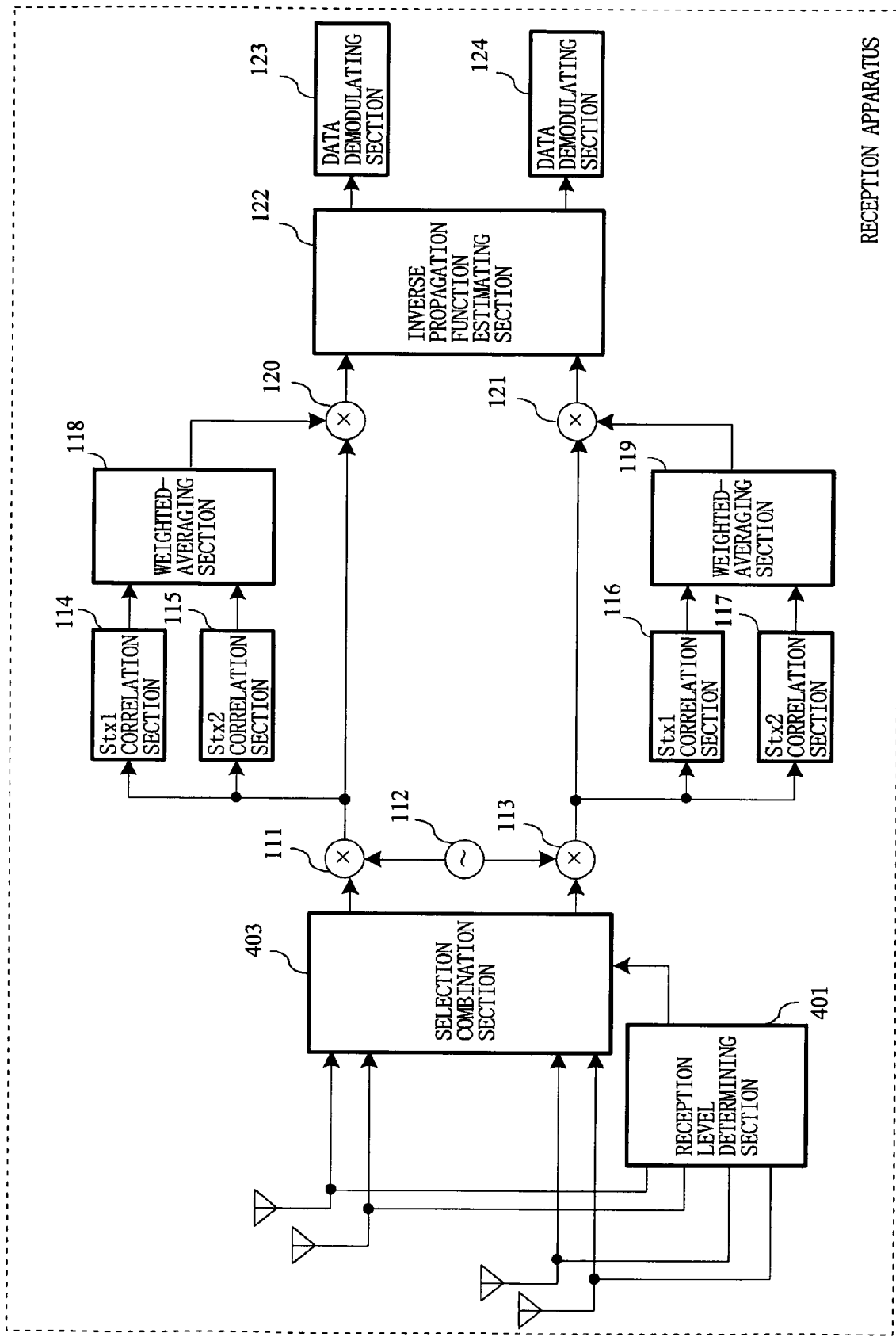
FIG. 12 is a block diagram illustrating an exemplary structure of a reception apparatus which collectively comprises reception antennas the number of which is larger than the number of reception systems.

Note that the reception apparatus of the fourth embodiment may collectively comprise reception antennas the number of which is larger than the number of reception systems instead of comprising a plurality of antennas for each reception system. FIG. 12 is a block diagram illustrating an exemplary structure of the reception apparatus which collectively comprises reception antennas the number of which is larger than the number of reception systems. Referring to FIG. 12, the reception apparatus compares reception levels of the plurality of reception antennas to select or combine received signals, thereby making it possible to extract received signals corresponding to the number of reception systems.

As described above, according to the reception apparatus of the fourth embodiment of the present invention, even when the reception level of a specific subcarrier decreases in the frequency selective fading environment, the correlation of a synchronization subsymbol can be correctly calculated by the reception diversity effect caused by selection or combination of a plurality of reception antennas. Thereby, the transfer apparatus can more correctly correct a carrier frequency error in each transfer path, thereby improving the precision of estimation of an inverse propagation coefficient function.

Note that the method of providing a plurality of reception antennas for each reception system, which is described in the fourth embodiment, can be combined with the first, second, and third embodiments.

Fifth Embodiment

Figure 13:
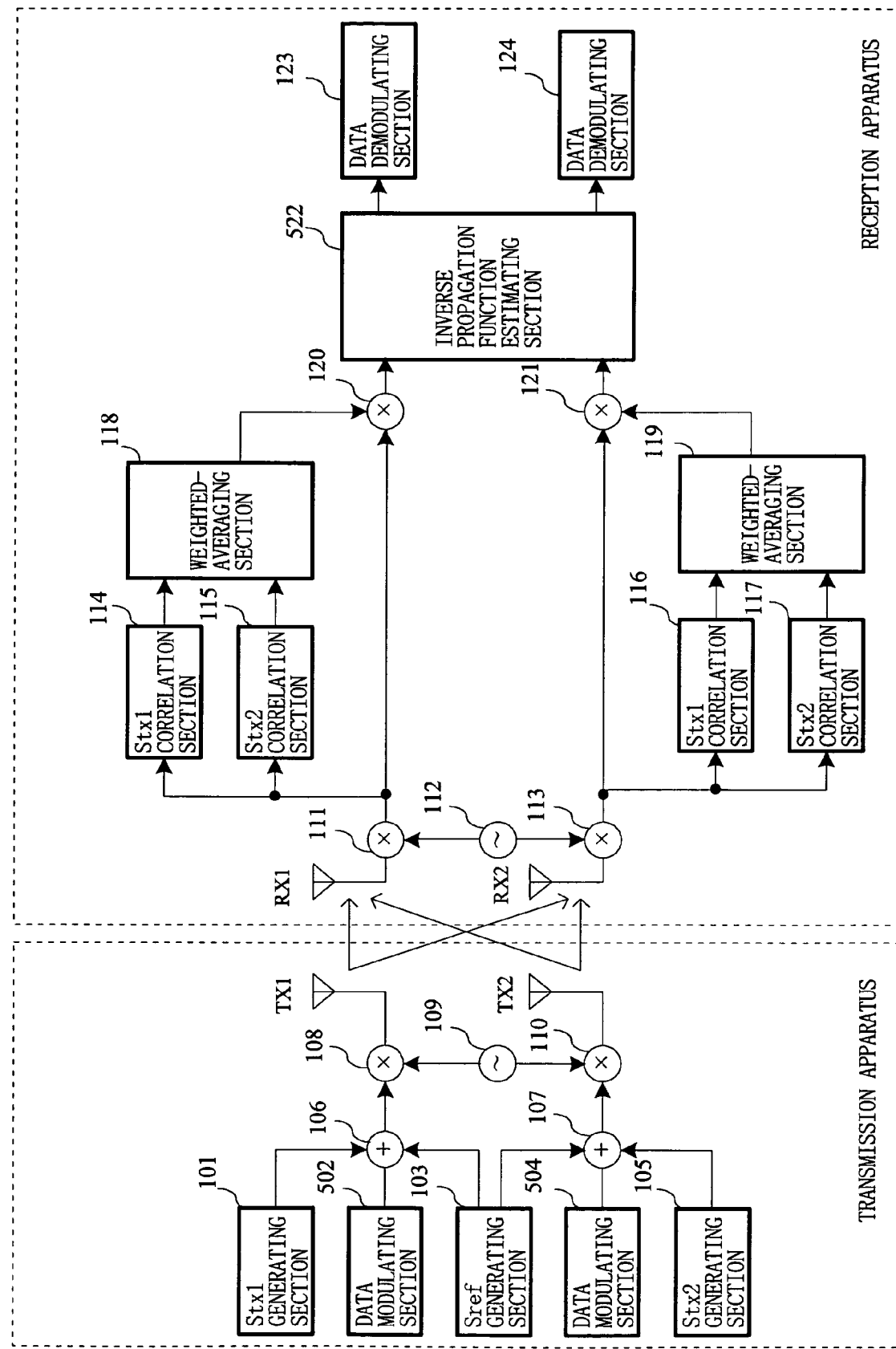
FIG. 13 is a block diagram illustrating an exemplary structure of a transfer apparatus according to a fifth embodiment of the present invention.
Figure 14:
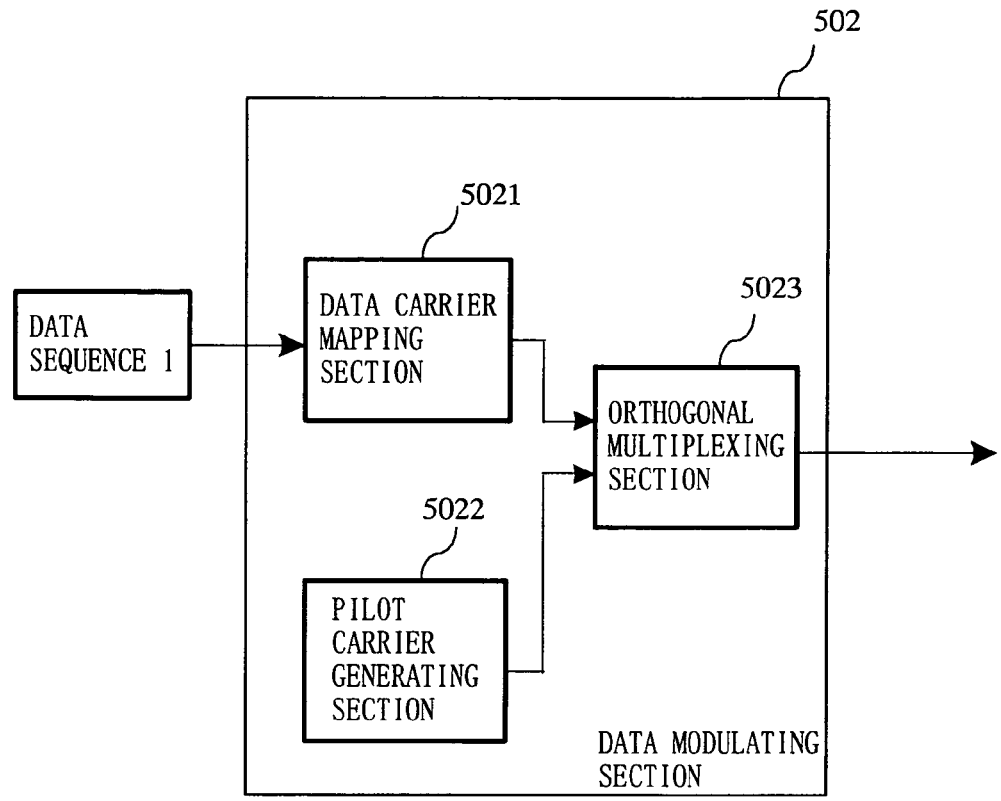
FIG. 14 is a block diagram illustrating exemplary structures of data modulating sections 502 and 504 of the fifth embodiment of the present invention.
Figure 14:
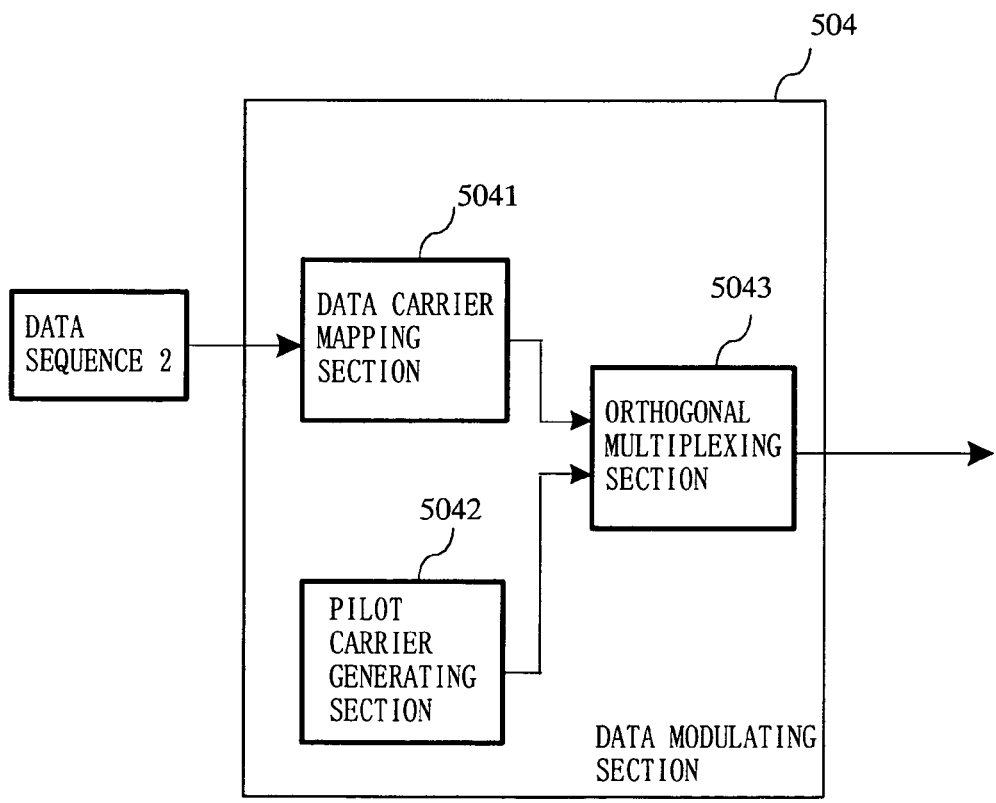
Figure 15:
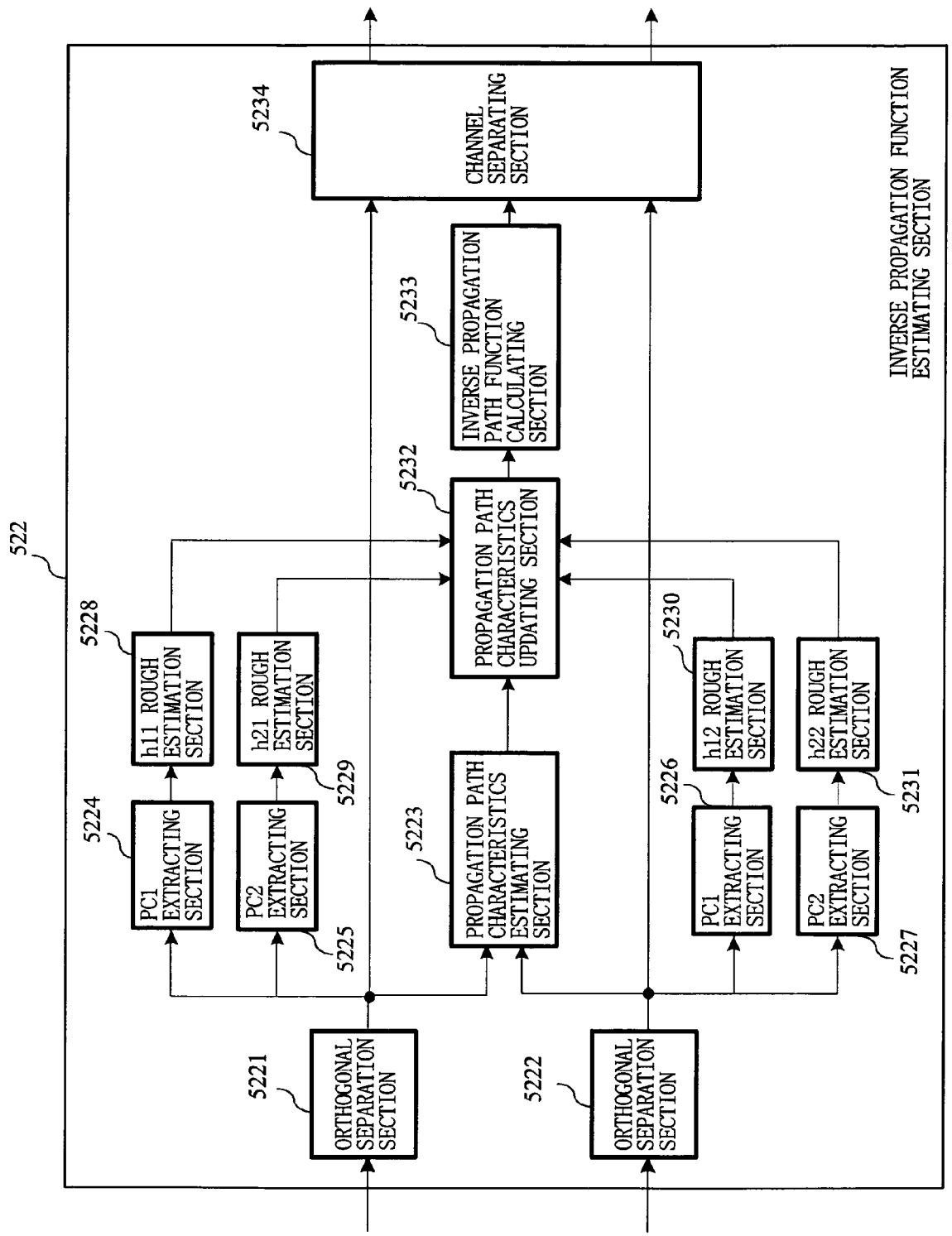
FIG. 15 is a block diagram illustrating an exemplary structure of an inverse propagation function estimating section 522 of the fifth embodiment of the present invention.

FIG. 13 is a block diagram illustrating an exemplary structure of a transfer apparatus according to a fifth embodiment of the present invention. In FIG. 13, the transfer apparatus of the fifth embodiment of the present invention is different from that of the first embodiment (see FIG. 1) in data modulating sections 502 and 504 and an inverse propagation function estimating section 522. FIG. 14 is a block diagram illustrating exemplary structures of the data modulating sections 502 and 504 of the fifth embodiment of the present invention. FIG. 15 is a block diagram illustrating an exemplary structure of the inverse propagation function estimating section 522 of the fifth embodiment of the present invention.

In FIG. 14, the data modulating section 502 comprises a data carrier mapping section 5021, a pilot carrier-1 generating section 5022, and an orthogonal multiplexing section 5023. The data modulating section 504 comprises a data carrier mapping section 5041, a pilot carrier-2 generating section 5042, and an orthogonal multiplexing section 5043.

The data modulating section 502 modulates a data sequence 1 to generate a data symbol sequence 1 in a manner similar to that of the first embodiment. The data symbol sequence 1 is an OFDM symbol obtained by subjecting a plurality of subcarriers to orthogonal multiplexing on a frequency axis. Hereinafter, an operation of the data modulating section 502 which is different from that of the first embodiment will be described. The data modulating section 502 assigns a known phase and amplitude to predetermined subcarriers included in a plurality of subcarriers included in the data symbol sequence 1 to generate pilot carriers. The data modulating section 502 assigns phases and amplitudes to subcarriers other than the pilot carriers based on the data sequence 1 to generate data carriers.

In the data modulating section 502, the data carrier mapping section 5021 maps phases and amplitudes to data carriers based on the input data sequence 1. In this case, as a mapping rule, PSK, QAM, or the like is used. The pilot carrier-1 generating section 5022 assigns predetermined phases and amplitudes to predetermined subcarriers as pilot carriers. A plurality of subcarriers output from the data carrier mapping section 5021 and the pilot carrier-1 generating section 5022 are input to the orthogonal multiplexing section 5023. The orthogonal multiplexing section 5023 subjects the plurality of subcarriers to orthogonal multiplexing to generate a time-axis waveform of data symbols (i.e., the data symbol sequence 1). Note that, as orthogonal multiplexing, inverse Fourier transform, inverse wavelet transform, inverse discrete cosine transform, or the like is used.

In the data modulating section 504, a data symbol sequence 2 is generated in a manner similar to that of the data modulating section 502.

Figure 16:
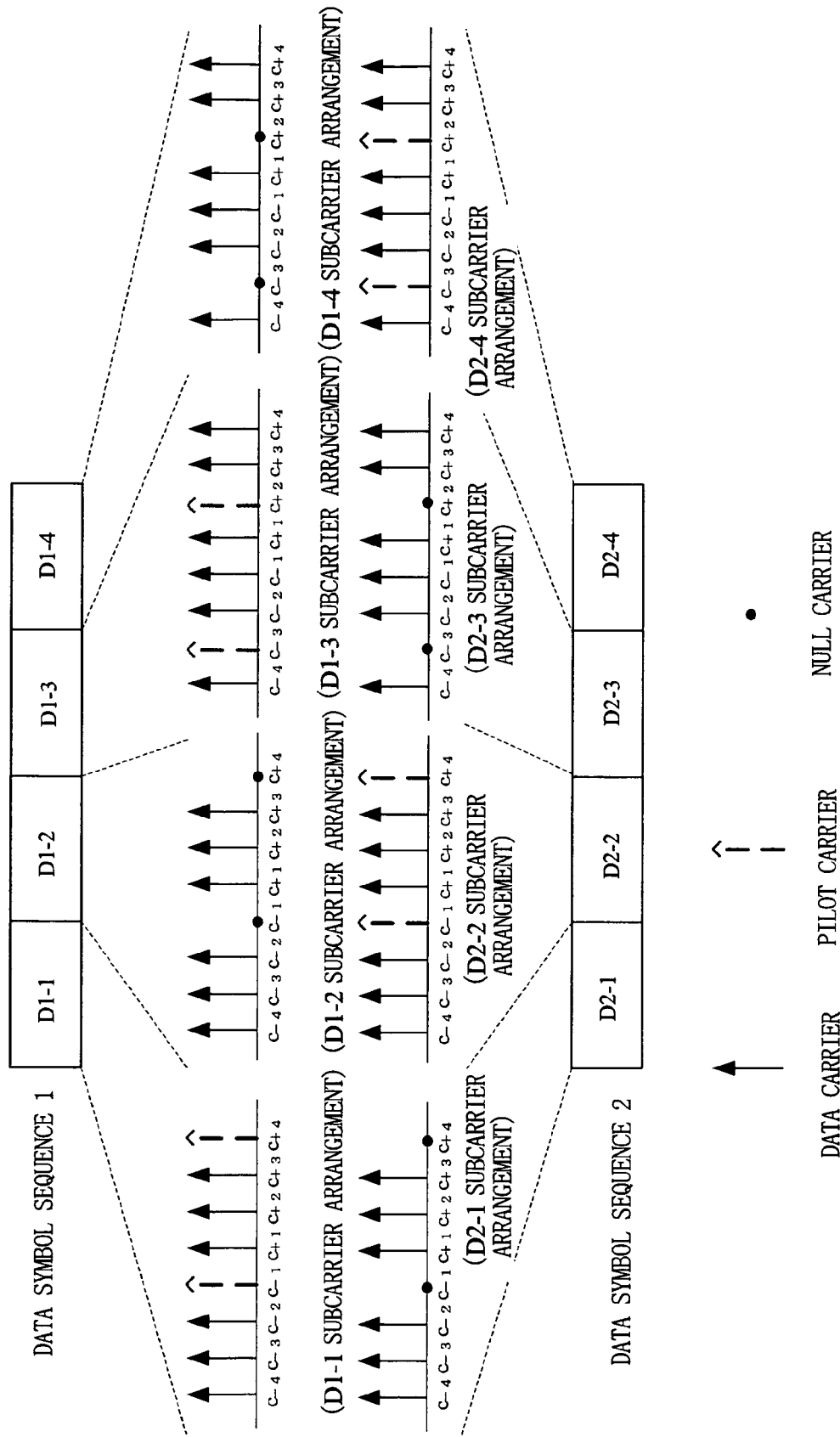
FIG. 16 is a diagram illustrating exemplary data symbol sequences generated by data modulating sections 502 and 504.

FIG. 16 is a diagram illustrating exemplary data symbol sequences generated by the data modulating sections 502 and 504.

In FIG. 16, each data symbol sequence is composed of four data symbols, and each data symbol is composed of eight subcarriers. Note that these numbers can be arbitrarily extended.

In FIG. 16, the first stage and the fourth stage indicate arrangements on a time axis of respective data symbol sequences. The data symbol sequence 1 transmitted from the transmission antenna TX1 is composed of four data symbols D1-1, D1-2, D1-3, and D1-4. Similarly, the data symbol sequence 2 transmitted from the transmission antenna TX2 is composed of four data symbols D2-1, D2-2, D2-3, and D2-4. These data symbol sequences are simultaneously transmitted from the respective antennas. Specifically, for the data symbol sequences, the data symbols D1-1 and D2-1 are simultaneously transmitted at a first time, the data symbols D1-2 and D2-2 are simultaneously transmitted at a second time, and so on.

On the other hand, in FIG. 16, the second stage and the third stage indicate arrangements on a frequency axis of respective data symbols. Each data symbol is composed of eight subcarriers C−4, C−3, C−2, C−1, C+1, C+2, C+3, and C+4. Among arrows indicating subcarriers, a solid line indicates a data carrier, and a dashed line indicates a pilot carrier. The absence of an arrow at a subcarrier position indicates a null carrier having an amplitude of 0.

The data modulating section 502 assigns pilot carriers to the subcarrier numbers C−1 and C+4 of the data symbols D1-1 and D2-1 which are to be transmitted at the first time. In this case, a predetermined phase and an amplitude larger than 0 are assigned to the pilot carrier of D1-1. On the other hand, a null carrier having an amplitude of 0 is assigned to the pilot carrier of D2-1. Thereby, in the data symbols D1-1 and D2-1 which are to be transmitted at the first time, the subcarrier numbers C−1 and C+4 are transmitted only from the transmission antenna TX1. Thereby, in the reception apparatus, the subcarrier numbers C−1 and C+4 of the data symbol which is received at the first time, it is possible to estimate a propagation coefficient (h (1, 1), h (1, 2)) between the transmission antenna TX1 and each reception antenna.

Next, in the data symbols D1-2 and D2-2 which are to be transmitted at the second time, pilot carriers are assigned to the same subcarrier numbers (C−1 and C+4) as those of the pilot carrier transmitted at the first time. Note that, conversely with respect to those which were transmitted at the first time, a predetermined phase and an amplitude larger than 0 are assigned to the pilot carrier of D2-2, and a null carrier having an amplitude of 0 is assigned to the pilot carrier of D1-2. Thereby, in the data symbols D1-2 and D2-2 which are to be transmitted at the second time, the subcarrier numbers C−1 and C+4 are transmitted only from the transmission antenna TX2. Thereby, in the reception apparatus, the subcarrier numbers C−1 and C+4 of the data symbols which are received at the second time are used, thereby making it possible to estimate a propagation coefficient (h (2, 1), h (2, 2)) between the transmission antenna TX2 and each reception antenna.

Also in data symbols which are to be transmitted at third and fourth times, pilot carriers are assigned to the subcarrier numbers C−3 and C+2. Specifically, in the data symbol which is to be transmitted at the third time, a predetermined phase and an amplitude larger than 0 are assigned to C−3 and C+2 of D1-3, and a null carrier having an amplitude of 0 is assigned to C−3 and C+2 of D2-3. In the data symbol which is to be transmitted at the fourth time, a null carrier having an amplitude of 0 is assigned to C−3 and C+2 of D1-4, and a predetermined phase and an amplitude larger than 0 are assigned to C−3 and C+2 of D2-4. Thereby, the reception apparatus can estimate h (1, 1) and h (1, 2) from the data symbol received at the third time and h (2, 1) and h (2, 2) from the data symbol received at the fourth time.

Figure 17:
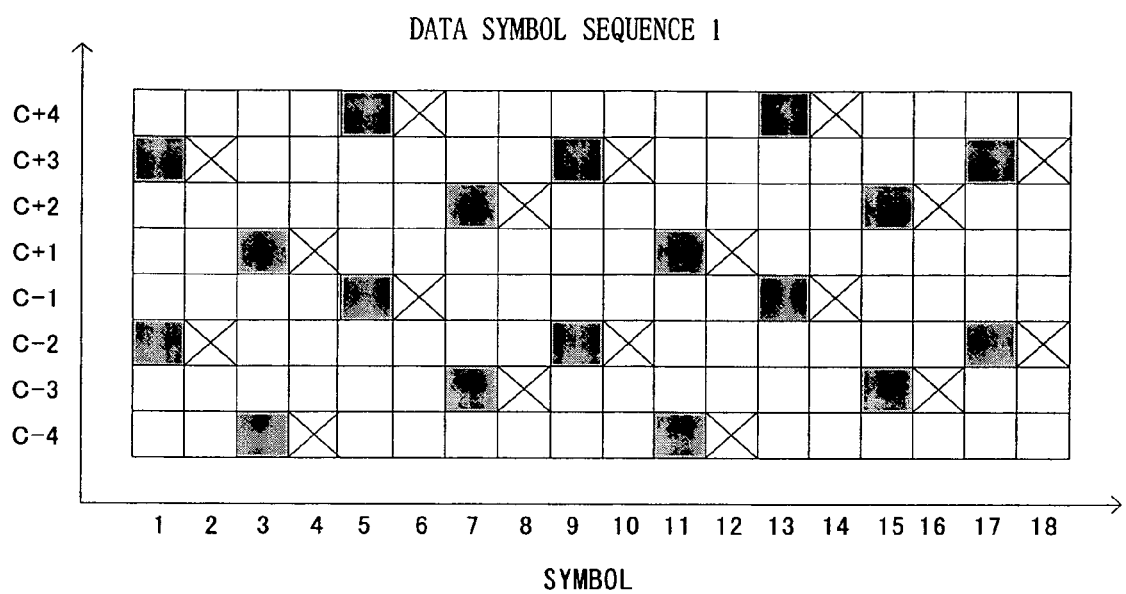
FIG. 17 is a diagram schematically illustrating time axis-vs-frequency axis arrangements of pilot carriers.
Figure 17:
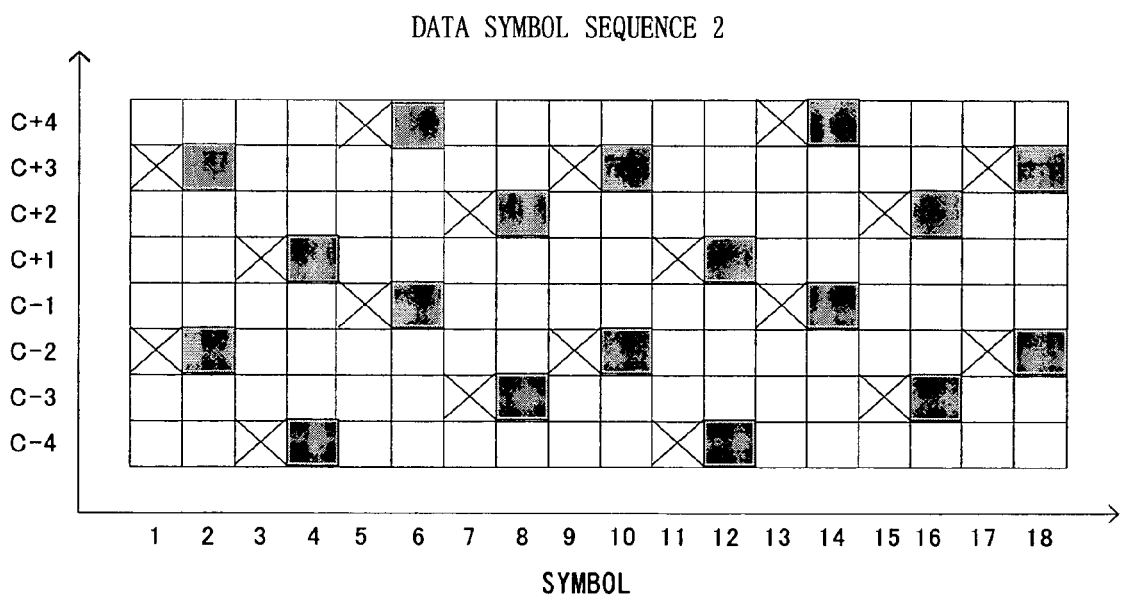
Figure 18:
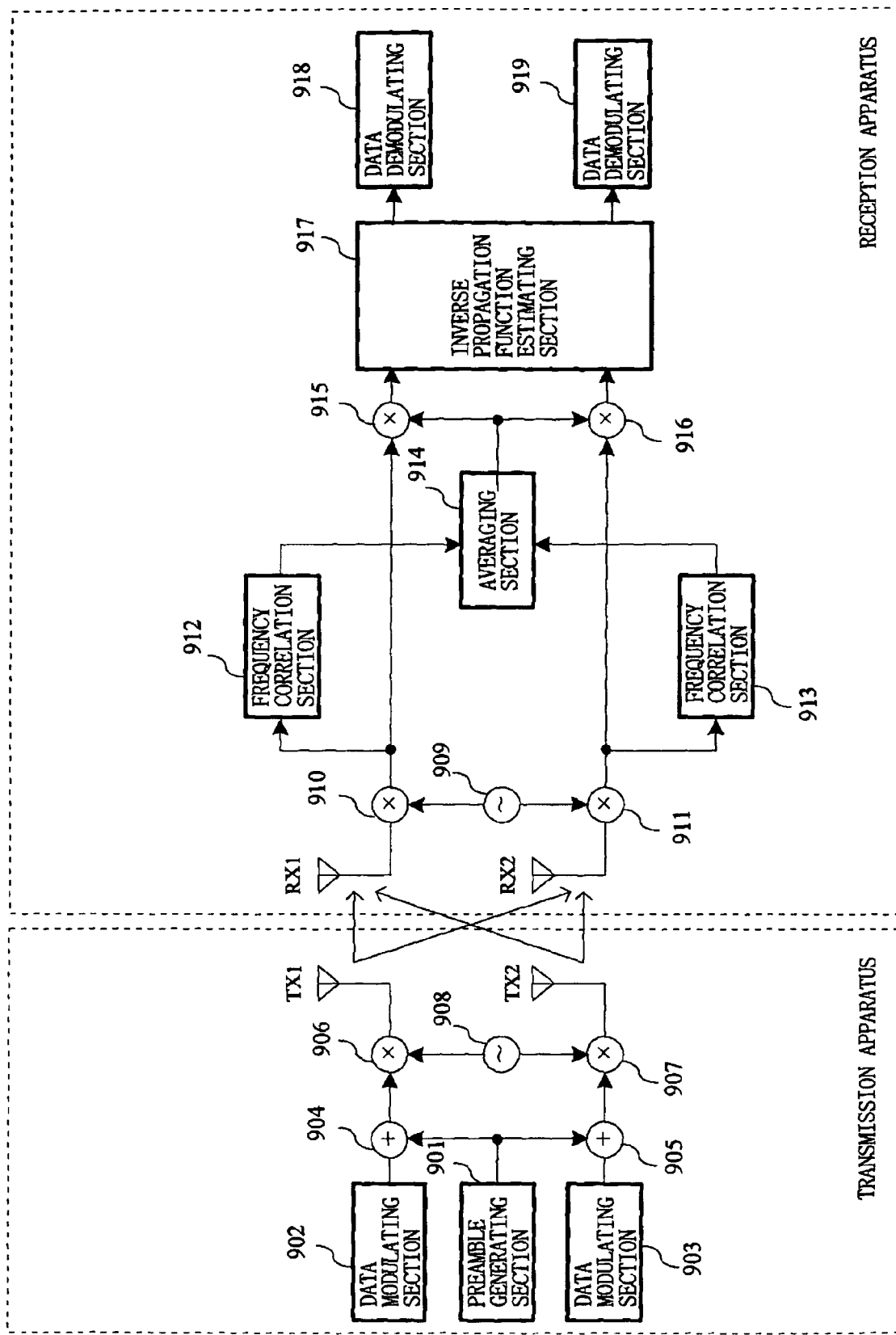
FIG. 18 is a block diagram illustrating an exemplary structure of a conventional transfer apparatus.
Figure 19:
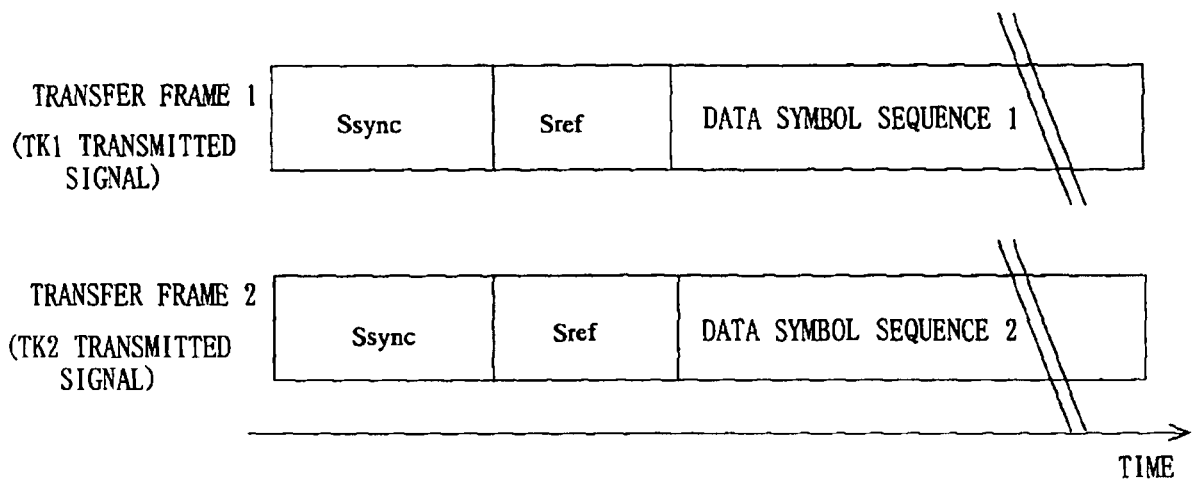
FIG. 19 is a diagram illustrating an exemplary transfer frame used in a conventional transfer apparatus.

FIG. 17 is a diagram schematically illustrating time axis-vs-frequency axis arrangements of pilot carriers. FIG. 17(a) illustrates the data symbol sequence 1 transmitted from the transmission antenna TX1. FIG. 17(b) illustrates the data symbol sequence 2 transmitted from the transmission antenna TX2. Here, the horizontal axis indicates time (symbol number) and the vertical axis indicates frequency (subcarrier number). A quadrangle indicates a subcarrier, a white quadrangle indicates a data carrier, a gray quadrangle indicates a pilot carrier, and a quadrangle having x indicates a null carrier.

At least two subcarriers (hereinafter referred to as a pilot subcarrier) to which a pilot carrier or a null carrier is assigned are assigned to one data symbol. In a plurality of data symbols which are to be simultaneously transmitted, a pilot carrier having a predetermined phase and an amplitude larger than 0 is assigned to a pilot subcarrier of one of the data symbols, and a null carrier having an amplitude of 0 is assigned to a pilot subcarrier of another of the data symbols. More preferably, the assignment of the pilot carrier and the null carrier is switched for a data symbol to be transmitted at a next time. For example, as illustrated in FIG. 17, in the data symbol sequence 1, the pilot carrier is transmitted in odd-numbered data symbols, and the null carrier is transmitted in even-numbered data symbols. On the other hand, in the data symbol sequence 2 transmitted at the same time, the null carrier is transmitted in odd-numbered data symbols, and the pilot carrier is transmitted in even-numbered data symbols.

The same subcarrier number may be assigned to a pilot subcarrier in all data symbols. More preferably, the subcarrier number of the pilot subcarrier may be changed for each data symbol in accordance with a predetermined sequence. Thereby, even when the amplitude of a subcarrier is extremely decreased due to specific frequency selective fading, it is possible to reduce the probability that the amplitude of a received pilot carrier is extremely decreased. Therefore, the transfer apparatus can estimate a propagation coefficient with high precision. In FIG. 17, the pilot subcarrier is changed every two data symbols. Here, it is assumed that two pilot subcarriers are assigned to one data symbol and the interval between the pilot subcarriers is constant. It is assumed that at least one pilot subcarrier is assigned to all subcarriers. More preferably, all subcarriers are divided at a pilot subcarrier position, and the next pilot subcarrier is assigned to a subcarrier which is located in the vicinity of a center of a band in which there are a number of subcarriers to which a pilot subcarrier is not assigned, and is at a distance from the pilot subcarrier of the previous symbol.

This assignment method will be specifically described with reference to FIG. 17. Here, only the subcarrier numbers C+1, C+2, C+3, and C+4 will be described. In the first and second data symbols, C+3 is selected as a subcarrier in the vicinity of a center of the four subcarrier bands, and is used as a pilot subcarrier. Next, in the third and fourth data symbols, a subcarrier band is divided, at C+3, into two, i.e., a group of C+1 and C+2, and C+4. Here, the group of C+1 and C+2 is selected, and C+1 is selected, which is at a distance from the pilot subcarrier of the previous symbol of the subcarriers in the vicinity of the center, and C+1 is used as a pilot subcarrier. In the fifth and sixth data symbols, the subcarrier bands are divided with the previous pilot subcarriers C+3 and C+1 into C+2 and C+4. Among them, C+4 is selected which is at a distance from the pilot subcarrier of the previous symbol, and is used as a pilot subcarrier. Finally, in the seventh and eighth data symbols, the remainder C+2 is used as a pilot subcarrier. This is repeatedly performed for the subsequent data symbols, and by the cycles, all subcarriers are assigned to pilot subcarriers.

With such an assignment method, in each data symbol, pilot carriers are arranged so that a distance between a data carrier and a pilot carrier is short in terms of frequency or time. Therefore, when the propagation coefficients of all subcarriers are calculated by frequency-direction interpolation and time-direction interpolation, the precision can be improved. Specifically, when a propagation path has a mild variation, the propagation path coefficient of a certain subcarrier has a high correlation with the propagation path coefficient of a subcarrier adjacent thereto in a frequency direction and a time direction. This is because a propagation path coefficient calculated by interpolation of propagation path coefficients estimated from subcarriers close in terms of frequency or time provides higher precision than that of a propagation path coefficient calculated by interpolation of propagation path coefficients estimated from a subcarrier distant in terms of frequency or time.

Note that it is assumed that the pilot subcarrier assignment sequence is determined in advance, depending on the number of subcarriers, the number of pilot subcarriers, and the number of data symbols to be simultaneously transmitted, and is known in the transmission apparatus and the reception apparatus.

The inverse propagation function estimating section 522 which separates a data symbol sequence in which a pilot carrier is inserted, will be described with reference to FIG. 15. In FIG. 15, the inverse propagation function estimating section 522 comprises orthogonal separation sections 5221 and 5222, a propagation path characteristics estimating section 5223, pilot carrier-1 extracting section 5224 and 5226, pilot carrier-2 extracting sections 5225 and 5227, an h11 rough estimation section 5228, an h21 rough estimation section 5229, an h12 rough estimation section 5230, an h22 rough estimation section 5231, a propagation path characteristics updating section 5232, an inverse propagation path function calculating section 5233, and a channel separating section 5234.

A received symbol sequence for which a frequency error is estimated and corrected using a synchronization symbol as described in the first to fourth embodiments is input to the inverse propagation function estimating section 522. A symbol sequence received by the reception antenna RX1 is input to the orthogonal separation section 5221. A symbol sequence received by the reception antenna RX2 is input to the orthogonal separation section 5222. The orthogonal separation sections 5221 and 5222 subject each symbol to orthogonal separation into subcarriers on a frequency axis. Note that, as orthogonal separation, Fourier transform, wavelet transform, discrete cosine transform, or the like can be used.

Among the symbols separated into subcarriers, a propagation coefficient estimation symbol Sref is input to the propagation path characteristics estimating section 5223. The propagation path characteristics estimating section 5223 estimates propagation path characteristics h (i, j) between each antenna from a correlation between a known propagation coefficient estimation symbol Sref and the received propagation coefficient estimation symbol Sref. The subsequent received data symbols are subjected to equalization in which the inverse propagation coefficient function of each transfer path is estimated and an interference component is canceled, so that a data symbol sequence transmitted from each transmission antenna is separated.

However, an estimated frequency value calculated using the above-described synchronization symbol includes an estimation error (residual frequency error) due to an influence of noise, phase noise, or the like. Therefore, in a received symbol sequence, phase rotation occurs due to the residual frequency error. When the residual frequency error is large, a larger phase difference occurs in a data symbol with an increase in a temporal distance from the propagation coefficient estimation symbol Sref. Therefore, in the reception apparatus, an error occurs in the estimation of an inverse propagation coefficient function, i.e., a reception error occurs.

The above-described pilot carrier is used in order to correct such phase rotation caused by the residual frequency error. A received data symbol which has been received by RX1 and separated into subcarriers, is input to the pilot carrier-1 extracting section 5224 and the pilot carrier-2 extracting section 5225. The pilot carrier-1 extracting section 5224 extracts a pilot carrier 1. The pilot carrier-2 extracting section 5225 extracts a pilot carrier 2. Since the pilot carrier 1 is transmitted only from the transmission antenna TX1, propagation path characteristics h' (1, 1) between TX1 and RX1 for all subcarriers can be estimated by frequency- or time-direction interpolation based on a correlation between the received pilot carrier 1 and a known pilot carrier 1. Similarly, since the pilot carrier 2 is transmitted only from the transmission antenna TX2, propagation path characteristics h' (2, 1) between TX2 and RX1 can be estimated. These are performed in the h11 rough estimation section 5228 and the h21 rough estimation section 5229. Similarly, on the reception antenna RX2 side, h' (2, 1) and h' (2, 2) are estimated from pilot carriers.

The propagation coefficient h (i, j) estimated from the propagation coefficient estimation symbol Sref and the propagation coefficient h' (i, j) estimated based on the pilot carrier in each data symbol are input to the propagation path characteristics updating section 5232. Since h (i, j) and h' (i, j) have a phase difference due to a residual frequency error or phase noise, and a phase difference and an amplitude phase due to a transfer path variation, h (i, j) is used as an initial value, and an error between h (i, j) and h' (i, j) is used to update a propagation coefficient h" (i, j), thereby making it possible to estimate the propagation coefficient of each transfer path with higher precision.

The propagation coefficient h" (i, j) thus updated for each data symbol is input to the inverse propagation path function calculating section 5233, in which the inverse function is calculated. This inverse function is used in the channel separating section 5234 to separate the transmitted data symbol sequences 1 and 2 from the received data symbol sequence 1 which has been received in RX1 and separated into subcarriers and the received data symbol sequence 2 which has been received in RX2 and separated into subcarriers, followed by data demodulation.

As described above, according to the transmission apparatus of the fifth embodiment of the present invention, a pilot carrier can be generated in a data symbol by the data modulating sections 502 and 504 assigning a known phase and amplitude to a predetermined subcarrier. In addition, according to the reception apparatus, even when a residual error is present in frequency estimation using a synchronization symbol, a pilot carrier of a data symbol is used to estimate a residual error for each transfer path and correct a propagation coefficient, thereby making it possible to improve the precision of estimation of an inverse propagation coefficient function. In addition, even when the reception level of a specific subcarrier decreases in the frequency selective fading environment, the probability that the reception level of a pilot carrier decreases can be reduced by successively assigning a pilot carrier to all subcarriers. In addition, by the above-described pilot subcarrier assignment method, the precision of interpolation of a propagation path estimation value for each subcarrier can be caused to be uniform.

Note that the method of using the data modulating sections 502 and 504, and the inverse propagation function estimating section 522 which has been described in the fifth embodiment can be combined with the first to fourth embodiments.

The first to fifth embodiments have been described, assuming the case where the transmission apparatus and the reception apparatus are simultaneously used. The above-described transmission apparatus and reception apparatus can be used singly or in combination with other apparatuses. For example, the transmission apparatus may transmit a signal to not only the above-described reception apparatus but also other reception apparatuses. The reception apparatus may receive not only a signal transmitted from the above-described transmission apparatus but also other transmission apparatuses if the signal only has a matched format.

Each of the processes performed by the transmission apparatus and the reception apparatus described in the first to fifth embodiments may be achieved by a CPU interpreting and executing a predetermined program data which can execute the above-described processes, the data being stored in a storage apparatus (a ROM, a RAM, a hard disk, etc.). In this case, the program data may be introduced into the storage apparatus via a storage medium, or may be executed directly from the storage medium. Note that the storage medium refers to a semiconductor memory (e.g., a ROM, a RAM, a flash memory, or the like), a magnetic disk memory (e.g., a flexible disk, a hard disk, or the like), an optical disk memory (e.g., a CD-ROM, a DVD, a BD, etc.), a memory card, or the like. The storage medium also has a concept encompassing a telephone line, a transmission path, and the like.

In addition, constitutions included in the transmission apparatus and the reception apparatus described in the first to fifth embodiments can be implemented as integrated circuits (LSI) These may be implemented on respective separate chips, or alternatively, a part or the whole of each constitution may be implemented on a single chip. LSI may be called IC, system LSI, super LSI, or ultra LSI, depending on the packaging density.

The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used. Further, if an integrated circuit technology which replaces LSI is developed by an advance in the semiconductor technology or other technologies derived therefrom, functional blocks may be packaged using such a technology. A biotechnology may be applicable.

INDUSTRIAL APPLICABILITY

The data transmission method and the data reception method of the present invention can be applied to a transmission apparatus, a reception apparatus, and the like to which MIMO-OFDM is applied.

What is claimed:

1. A data transmission method for a transmission apparatus for transmitting a plurality of data sequences from a plurality of transmission antennas to a plurality of reception antennas using MIMO-OFDM, the method comprising:
    dividing a synchronization symbol in which predetermined amplitudes and phases are assigned to a plurality of subcarriers which are spaced at predetermined frequency intervals and are orthogonal to each other, into the plurality of transmission antennas, to generate a plurality of synchronization subsymbols;
    modulating a plurality of pieces of transmission data to be transmitted from the plurality of transmission antennas into a plurality of data symbol sequences;
    generating propagation coefficient estimation symbols, that are orthogonal to each other, between each of the transmission antennas as symbols for estimating inverse functions of propagation coefficients possessed by a plurality of transfer paths between the transmission antennas and the reception antennas;
    multiplexing the data symbol sequences, the synchronization subsymbols, and the propagation coefficient estimation symbols into a transfer frame for each of the plurality of transmission antennas; and
    converting the transfer frames multiplexed for the plurality of transmission antennas into radio signals; and
    simultaneously transmitting the radio signals from the plurality of transmission antennas,
    wherein, in said simultaneously transmitting, a plurality of different transmission local oscillators are used for the plurality of transmission antennas, respectively.

2. The data transmission method according to claim 1, wherein said modulating into the data symbol sequence comprises:
    generating a data carrier by applying an amplitude and a phase based on the transmission data to a predetermined one of the plurality of subcarriers;
    generating a pilot carrier by assigning a known phase and amplitude to a subcarrier other than the data carrier; and
    orthogonally multiplexing the data carrier and the pilot carrier into a plurality of data symbols, and outputting the plurality of orthogonally multiplexed data symbols as the data symbol sequence.

3. The data transmission method according to claim 2, wherein said generating of the pilot carrier comprises assigning a known phase and amplitude as the pilot carrier to only one of data symbols to be simultaneously transmitted from the plurality of transmission antennas, and assigning an amplitude of 0 as the pilot carrier to the other data symbols to be simultaneously transmitted.

4. A data reception method for a reception apparatus for receiving a plurality of data sequences transmitted from a plurality of transmission antennas using MIMO-OFDM, via a plurality of reception antennas, wherein
    the plurality of data sequences include synchronization subsymbols generated by dividing a synchronization symbol composed of a plurality of subcarriers orthogonal to each other into the plurality of transmission antennas,
    the method comprising:
    receiving the plurality of data sequences for each of the reception antennas;
    synchronizing and demodulating the data sequences received by the plurality of reception antennas for each of the reception antennas; and
    estimating characteristics possessed by a plurality of transfer paths between the transmission antennas and the reception antennas, for each of the transfer paths, based on a received signal demodulated for each of the reception antennas and the synchronization subsymbols included in the received signal,
    wherein, in said synchronizing and demodulating, a plurality of different reception local oscillators are used for the plurality of reception antennas, respectively.

5. The data reception method according to claim 4, wherein said estimating of the characteristics for each of the transfer paths comprises estimating a frequency error occurring in each of the transfer paths from a correlation between the received signal demodulated for each of the reception antennas and the synchronization subsymbol included in the received signal, and
    the data reception method further comprises, after said estimating of the characteristics for each of the transfer paths, correcting a frequency of the received signal based on the estimated frequency error.

6. The data reception method according to claim 5, wherein said correcting of the frequency of the received signal comprises:
    calculating a frequency correction value for correcting the received signal, for each of the reception antennas, by weighted-averaging the estimated frequency error occurring in each of the transfer paths; and
    correcting the frequency of the received signal based on the calculated frequency correction value for each of the reception antennas, and outputting the received signal having the corrected frequency.

7. The data reception method according to claim 5, wherein said estimating of the frequency error comprises generating a received symbol timing based on a weighted average of peak timings of correlation values between the received signal and the synchronization subsymbol included in the received signal.

8. The data reception method according to claim 5, wherein the received signal comprises propagation coefficient estimation symbols orthogonal to each other between each of the transmission antennas as symbols for estimating inverse functions of propagation coefficients possessed by the plurality of transfer paths between the transmission antennas and the reception antennas, and the data reception method further comprises, after said correcting of the frequency of the received signal, estimating the inverse function of the propagation coefficient for each of the plurality of transfer paths based on the propagation coefficient estimation symbol included in the received signal having the corrected frequency, and based on the estimated inverse function, separating signals transmitted from the plurality of transmission antennas from the plurality of received signals.

9. The data reception method according to claim 4, further comprising, between said synchronizing, said demodulating, and said calculating of the characteristics for each of the transfer paths, estimating a frequency error included in the demodulated received signal for each of the reception antennas, based on a correlation between the received signal demodulated by the synchronizing and demodulating step for each of the reception antennas, and the synchronization symbol synthesized from the synchronization subsymbol included in the received signal;

calculating an average frequency error with respect to the plurality of received signals by weighted-averaging the estimated frequency errors; and a second correcting of the frequencies of the plurality of received signals based on the calculated average frequency correction value.

10. The data reception method according to claim 4, wherein said receiving comprises:

receiving the signals transmitted from the plurality of transmission antennas using reception antennas the number of which is larger than the number of the plurality of data sequences;

determining reception levels of the signals received by the larger number of reception antennas; and selecting or combining the signals received by the larger number of reception antennas, depending on the determined reception levels.

11. The data reception method according to claim 4, wherein said estimating of the characteristics for each of the transfer paths comprises estimating rough frequency characteristics for each of the transfer paths by interpolation of phases and amplitudes of the plurality of subcarriers included in the received signal, based on the synchronization subsymbol included in the received signal demodulated for each of the reception antennas, and the method further comprises, after said estimating of the characteristics for each of the transfer paths, estimating inverse functions of propagation coefficients possessed by the plurality of transfer paths based on the estimated rough frequency characteristics of each of the transfer paths, and separating signals transmitted by the plurality of transmission antennas from the plurality of received signal based on the estimated inverse functions.

12. A data transmission apparatus for transmitting a plurality of data sequences from a plurality of transmission antennas to a plurality of reception antennas using MIMO-OFDM, the apparatus comprising:

a plurality of synchronization subsymbol generating sections for dividing a synchronization symbol in which predetermined amplitudes and phases are assigned to a plurality of subcarriers spaced at predetermined frequency intervals, into the plurality of transmission antennas, to generate a plurality of synchronization subsymbols which are orthogonal to each other between each of the plurality of transmission antennas;

a plurality of data modulation sections for modulating a plurality of pieces of transmission data to be transmitted from the plurality of transmission antennas into a plurality of data symbol sequences;

a plurality of propagation coefficient estimation symbol generation sections for generating propagation coefficient estimation symbols which are orthogonal to each other between each of the transmission antennas as symbols for estimating inverse functions of propagation coefficients possessed by a plurality of transfer paths between the transmission antennas and the reception antennas;

a plurality of multiplexing sections for multiplexing the data symbol sequences, the synchronization subsymbols, and the propagation coefficient estimation symbols into transfer frames for the plurality of transmission antennas;

a plurality of conversion sections for converting the transfer frames multiplexed for the plurality of transmission antennas into radio signals; and a plurality of different transmission local oscillators for transmitting the radio signals, the plurality of different transmission local oscillators being provided for the plurality of transmission antennas, respectively, wherein the plurality of transmission antennas simultaneously transmit signals modulated by the plurality of conversion sections.

13. A reception apparatus for receiving a plurality of data sequences transmitted from a plurality of transmission antennas using MIMO-OFDM, via a plurality of reception antennas, wherein the plurality of data sequences include synchronization subsymbols generated by dividing a synchronization symbol composed of a plurality of subcarriers orthogonal to each other for each of the plurality of transmission antennas the apparatus comprising:

a plurality of reception antennas for receiving the plurality of data sequences;

a plurality of demodulation sections of synchronizing and demodulating the data sequences received by the plurality of reception antennas for each of the reception antennas;

a plurality of synchronization subsymbol correlation sections of estimating a frequency error included in a received signal demodulated for each of the reception antennas from a correlation between the received signal and the synchronization subsymbol included in the received signal, for each transfer path;

a plurality of frequency correcting sections of correcting a frequency of the received signal based on the estimated frequency error for each of the plurality of reception antennas; and a plurality of different reception local oscillators for receiving the data seciuences, the plurality of different reception local oscillators being provided for the plurality of reception antennas, respectively.

14. A data transmission method for a transmission apparatus for transmitting a plurality of data sequences from a plurality of transmission antennas to a plurality of reception antennas using MIMO-OFDM, the method comprising:

dividing a synchronization symbol in which predetermined amplitudes and phases are assigned to a plurality of subcarriers which are spaced at predetermined frequency intervals and are orthogonal to each other, into the plurality of transmission antennas, to generate a plurality of synchronization subsymbols;

modulating a plurality of pieces of transmission data to be transmitted from the plurality of transmission antennas into a plurality of data symbol sequences;

generating propagation coefficient estimation symbols, that are orthogonal to each other, between each of the transmission antennas as symbols for estimating inverse functions of propagation coefficients possessed by a plurality of transfer paths between the transmission antennas and the reception antennas;

multiplexing the data symbol sequences, the synchronization subsymbols, and the propagation coefficient estimation symbols into a transfer frame for each of the plurality of transmission antennas; and converting the transfer frames multiplexed for the plurality of transmission antennas into radio signals; and simultaneously transmitting the radio signals from the plurality of transmission antennas, wherein in said simultaneously transmitting, a plurality of different transmission local oscillators are used for the plurality of transmission antennas, respectively, to simultaneously transmit the radio signals to the plurality of reception antennas for which a single reception local oscillator is used in common.

15. A data transmission method for a transmission apparatus for transmitting a plurality of data sequences from a plurality of transmission antennas to a plurality of reception antennas using MIMO-OFDM, the method comprising:

dividing a synchronization symbol in which predetermined amplitudes and phases are assigned to a plurality of subcarriers which are spaced at predetermined frequency intervals and are orthogonal to each other, into the plurality of transmission antennas, to generate a plurality of synchronization subsymbols;

modulating a plurality of pieces of transmission data to be transmitted from the plurality of transmission antennas into a plurality of data symbol sequences;

generating propagation coefficient estimation symbols, that are orthogonal to each other, between each of the transmission antennas as symbols for estimating inverse functions of propagation coefficients possessed by a plurality of transfer paths between the transmission antennas and the reception antennas;

multiplexing the data symbol sequences, the synchronization subsymbols, and the propagation coefficient estimation symbols into a transfer frame for each of the plurality of transmission antennas;

converting the transfer frames multiplexed for the plurality of transmission antennas into radio signals; and simultaneously transmitting the radio signals from the plurality of transmission antennas, wherein in said simultaneously transmitting, a single transmission local oscillator common to the plurality of transmission antennas is used to simultaneously transmit the radio signals to the plurality of reception antennas for which a plurality of different reception local oscillators are used, respectively.

16. A data reception method for a reception apparatus for receiving a plurality of data sequences transmitted from a plurality of transmission antennas using MIMO-OFDM, via a plurality of reception antennas, wherein the plurality of data sequences include synchronization subsymbols generated by dividing a synchronization symbol composed of a plurality of subcarriers orthogonal to each other into the plurality of transmission antennas, the method comprising:

receiving the plurality of data sequences for each of the reception antennas;

synchronizing and demodulating the data sequences received by the plurality of reception antennas for each of the reception antennas; and estimating characteristics possessed by a plurality of transfer paths between the transmission antennas and the reception antennas, for each of the transfer paths, based on a received signal demodulated for each of the reception antennas and the synchronization subsymbols included in the received signal, wherein in said synchronizing and demodulating, a single reception local oscillator common to the plurality of reception antennas is used to demodulate the data sequences that are transmitted, from the plurality of transmission antennas, by using a plurality of different transmission local oscillators for the plurality of transmission antennas, respectively.

17. A data reception method for a reception apparatus for receiving a plurality of data sequences transmitted from a plurality of transmission antennas using MIMO-OFDM, via a plurality of reception antennas, wherein the plurality of data sequences include synchronization subsymbols generated by dividing a synchronization symbol composed of a plurality of subcarriers orthogonal to each other into the plurality of transmission antennas, the method comprising:

receiving the plurality of data sequences for each of the reception antennas;

synchronizing and demodulating the data sequences received by the plurality of reception antennas for each of the reception antennas; and estimating characteristics possessed by a plurality of transfer paths between the transmission antennas and the reception antennas, for each of the transfer paths, based on a received signal demodulated for each of the reception antennas and the synchronization subsymbols included in the received signal, wherein in said synchronizing and demodulating, a plurality of different reception local oscillators are used for the plurality of reception antennas, respectively, to demodulate the data sequences that are transmitted from the plurality of transmission antennas for which a single transmission local oscillator is used in common.

* * * * *